US012730286B2

(12) United States Patent
Nakahara

(10) Patent No.: US 12,730,286 B2
(45) Date of Patent: Sep. 8, 2026

(54) ZOOM LENS AND IMAGE PICKUP APPARATUS

(71) Applicant: CANON KABUSHIKI KAISHA, Tokyo (JP)

(72) Inventor: Makoto Nakahara, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 214 days.

(21) Appl. No.: 18/785,317

(22) Filed: Jul. 26, 2024

(65) Prior Publication Data

US 2025/0085519 A1 Mar. 13, 2025

(30) Foreign Application Priority Data

Sep. 13, 2023 (JP) ................................ 2023-148485

(51) Int. Cl.
*G02B 15/14* (2006.01)
*G02B 15/16* (2006.01)

(52) U.S. Cl.
CPC ......... *G02B 15/1425* (2019.08); *G02B 15/16* (2013.01)

(58) Field of Classification Search
CPC ............ G02B 15/1451; G02B 15/1461; G02B 15/145121; G02B 15/144113; G02B 15/143507; G02B 15/144511; G02B 15/143105; G02B 15/144105; G02B 15/14; G02B 15/143503; G02B 15/144515; G02B 15/145113; G02B 15/145125; G02B 13/18; G02B 13/009; G02B 13/0045; G02B 13/0015; G02B 15/177; G02B 15/173
See application file for complete search history.

(56) References Cited

U.S. PATENT DOCUMENTS

| | | | | |
|---|---|---|---|---|
| 9,219,864 | B2 | 12/2015 | Nakahara | |
| 9,377,606 | B2 | 6/2016 | Nakahara | |
| 9,500,842 | B2 | 11/2016 | Nakahara | |
| 10,268,104 | B2 | 4/2019 | Nakahara | |
| 10,718,929 | B2 | 7/2020 | Nakahara | |
| 10,754,131 | B2 | 8/2020 | Nakahara | |
| 10,935,755 | B2 | 3/2021 | Nakahara | |
| 2009/0002844 | A1* | 1/2009 | Ito | G02B 15/144511 359/689 |
| 2021/0033835 | A1 | 2/2021 | Nakahara | |
| 2021/0356722 | A1* | 11/2021 | Kimura | G02B 15/145507 |
| 2022/0214530 | A1 | 7/2022 | Nakahara | |
| 2023/0213738 | A1 | 7/2023 | Nakahara | |
| 2023/0213739 | A1 | 7/2023 | Nakahara | |
| 2023/0305276 | A1* | 9/2023 | Noda | G02B 13/009 |
| 2024/0045184 | A1 | 2/2024 | Nakahara | |
| 2024/0241354 | A1 | 7/2024 | Nakahara | |

FOREIGN PATENT DOCUMENTS

| | | |
|---|---|---|
| JP | 2019-061270 A | 4/2019 |

* cited by examiner

*Primary Examiner* — Ephrem Z Mebrahtu
(74) *Attorney, Agent, or Firm* — Carter, DeLuca & Farrell LLP

(57) ABSTRACT

A zoom lens includes a first lens unit having negative refractive power and disposed closest to an object, and a rear group including three or more lens units and disposed on an image side of the first lens unit. A distance between adjacent lens units changes during zooming. The first lens unit moves toward the image side during zooming from a wide-angle end to a telephoto end. Predetermined inequalities are satisfied.

24 Claims, 13 Drawing Sheets d
g
M S
Fno= 2.91
ω= 20.1°
ω= 20.1°
ω= 20.1°
g
d
ΔS
ΔM
g
-0.400 0.400
-0.400 0.400
-15.000 15.000
-0.050 0.050
SPHERICAL ABERRATION
ASTIGMATISM
DISTORTION (%)
CHROMATIC ABERRATION d
g
M S
Fno= 2.91
ω= 17.4°
ω= 17.4°
ω= 17.4°
d
g
ΔS
ΔM
g
-0.400
0.400
-0.400
0.400
-15.000
15.000
-0.050
0.050
SPHERICAL ABERRATION
ASTIGMATISM
DISTORTION (%)
CHROMATIC ABERRATION d ——
g - - -
M - - - S ——

Fno= 2.91
ω= 46.1°
ω= 46.1°
ω= 46.1° g
d
ΔM
ΔS
g

-0.400 0.400
SPHERICAL ABERRATION

-0.400 0.400
ASTIGMATISM

-15.000 15.000
DISTORTION (%)

-0.050 0.050
CHROMATIC ABERRATION

M S
d
g
Fno= 2.91
ω= 15.3°
ω= 15.3°
ω= 15.3°
ΔS
ΔM
g
d
g
-0.400
0.400
-0.400
0.400
-15.000
15.000
-0.050
0.050
SPHERICAL ABERRATION
ASTIGMATISM
DISTORTION (%)
CHROMATIC ABERRATION

ZOOM LENS AND IMAGE PICKUP APPARATUS

BACKGROUND

Technical Field

One of the aspects of the embodiments relates to a zoom lens suitable for an image pickup apparatus, such as a digital camera.

Description of Related Art

So-called negative lead type zoom lenses are known as wide-angle zoom lenses in which a lens unit disposed closest to the object has negative refractive power. Japanese Patent Laid-Open No. 2019-61270 discloses a zoom lens including, in order from the object side to the image side, a first lens unit having negative refractive power, a second lens unit having positive refractive power, a third lens unit having negative refractive power, and a fourth lens unit having positive refractive power.

Negative lead type zoom lenses tend to have an asymmetric lens configuration with respect to the aperture stop, and it becomes difficult to correct various aberrations. Moreover, it is difficult to suppress aberration fluctuations during zooming, it is difficult to obtain high optical performance and a high magnification varying ratio. The zoom lens disclosed in Japanese Patent Laid-Open No. 2019-61270 can suppress aberration fluctuations during zooming, but the magnification varying ratio is insufficient.

SUMMARY

A zoom lens according to one aspect of the disclosure includes a first lens unit having negative refractive power and disposed closest to an object, and a rear group including three or more lens units and disposed on an image side of the first lens unit. A distance between adjacent lens units changes during zooming. The first lens unit moves toward the image side during zooming from a wide-angle end to a telephoto end. A sign of a moving amount of a lens unit configured to move toward the image side during zooming from the wide-angle end to the telephoto end is set positive. The following inequalities are satisfied:

$$0.30 \leq ML1/TLt \leq 0.90$$

$$-0.80 \leq fL1/ft \leq -0.40$$

where ML1 is a moving amount of the first lens unit during zooming from the wide-angle end to the telephoto end, TLt is an overall optical length of the zoom lens at the telephoto end, fL1 is a focal length of the first lens unit, and ft is a focal length of the zoom lens at the telephoto end. An image pickup apparatus having the above zoom lens also constitutes another aspect of the disclosure.

Further features of various embodiments of the disclosure will become apparent from the following description of embodiments with reference to the attached drawings.

DESCRIPTION OF THE EMBODIMENTS

Figure 1:
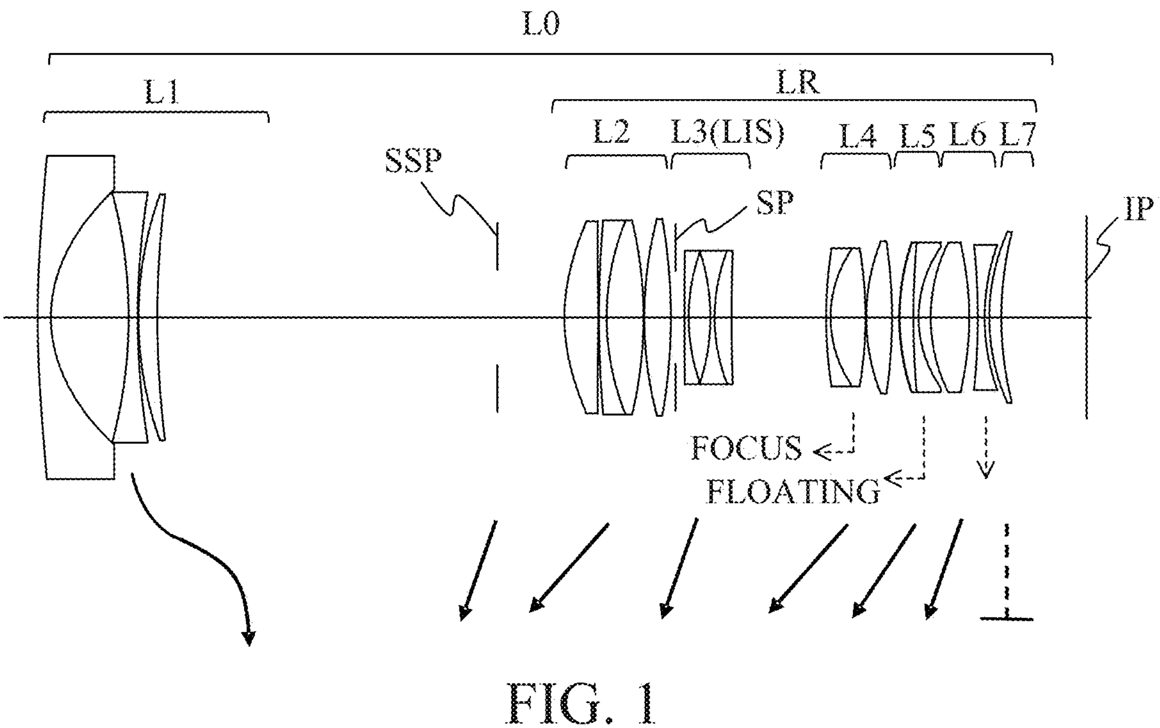
FIG. 1 is a sectional view of a zoom lens according to Example 1.
Figure 2A:
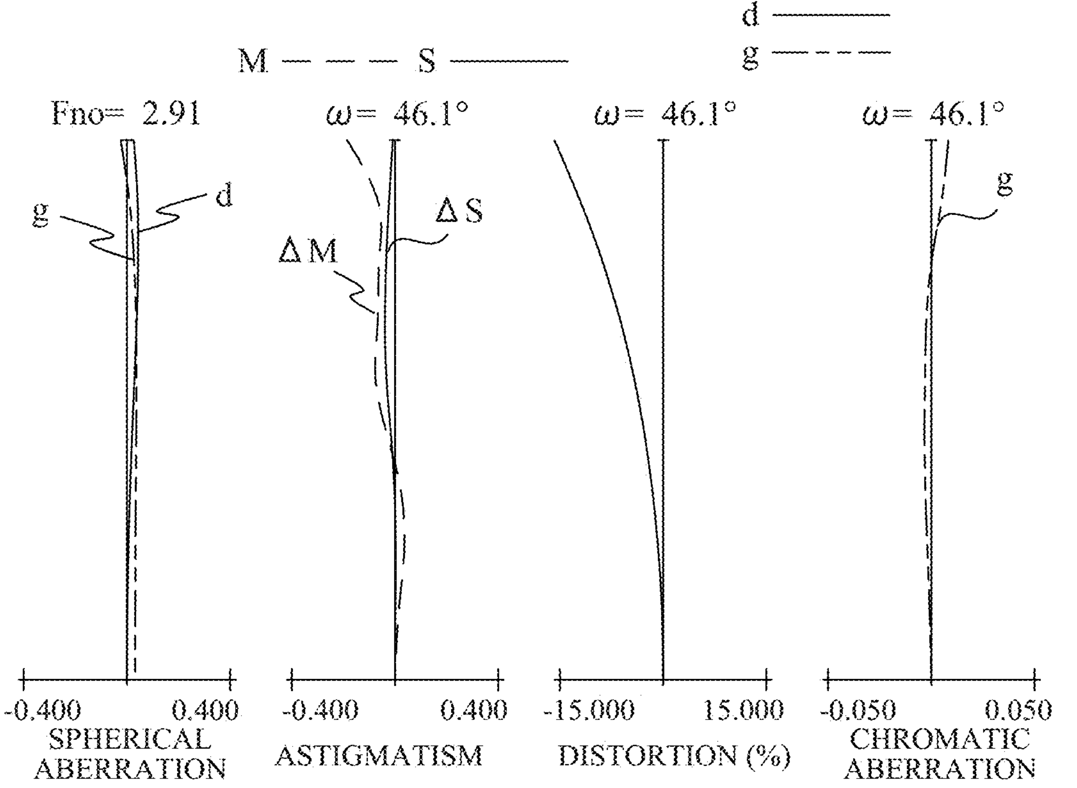
FIGS. 2A to 2C are aberration diagrams of the zoom lens according to Example 1.
Figure 2B:
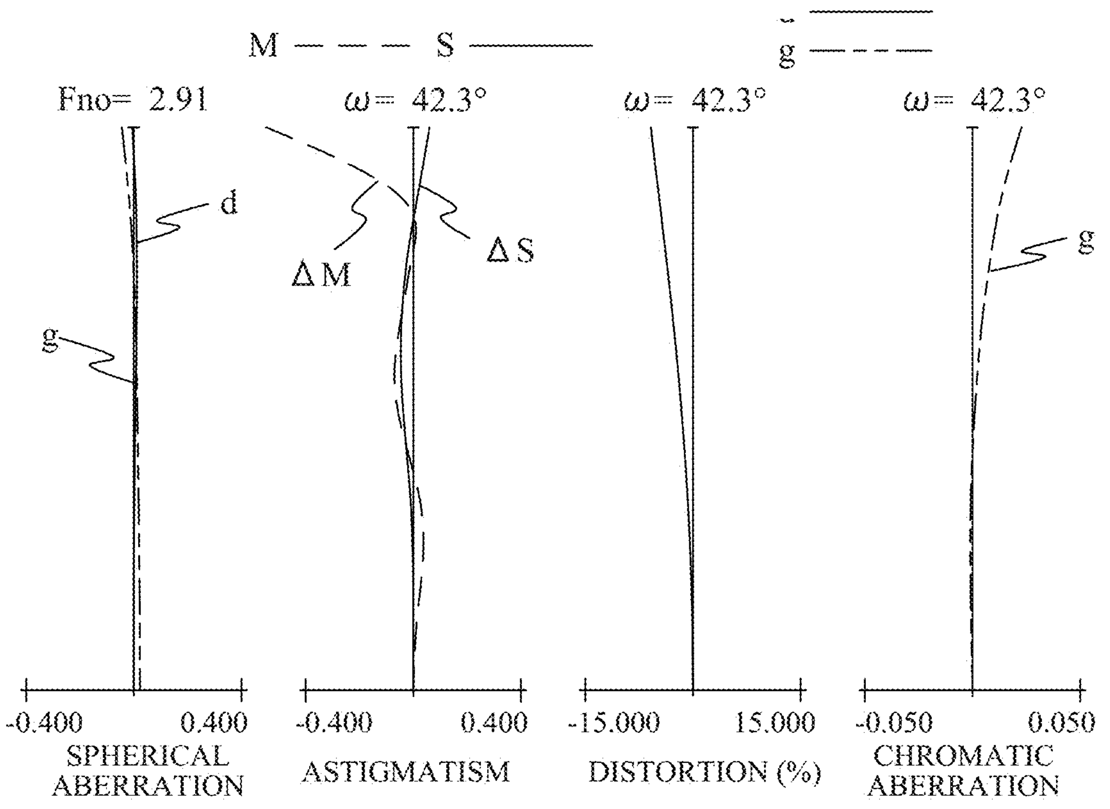
Figure 2C:
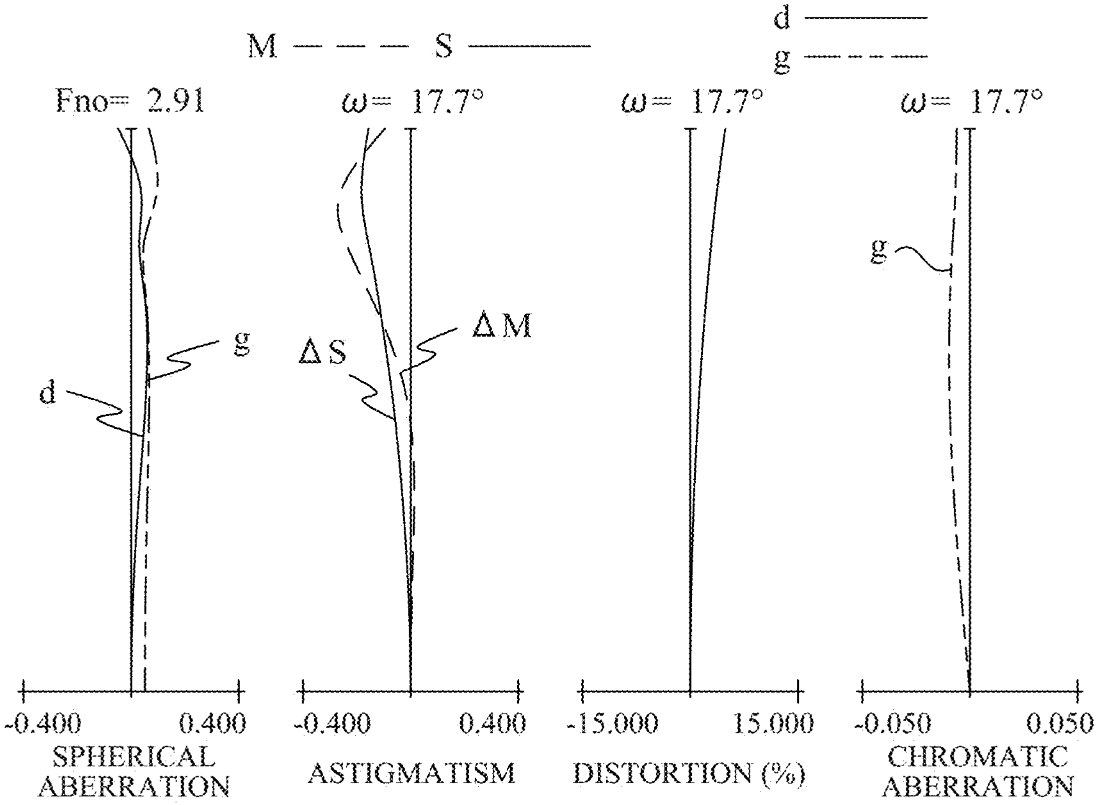
Figure 3:
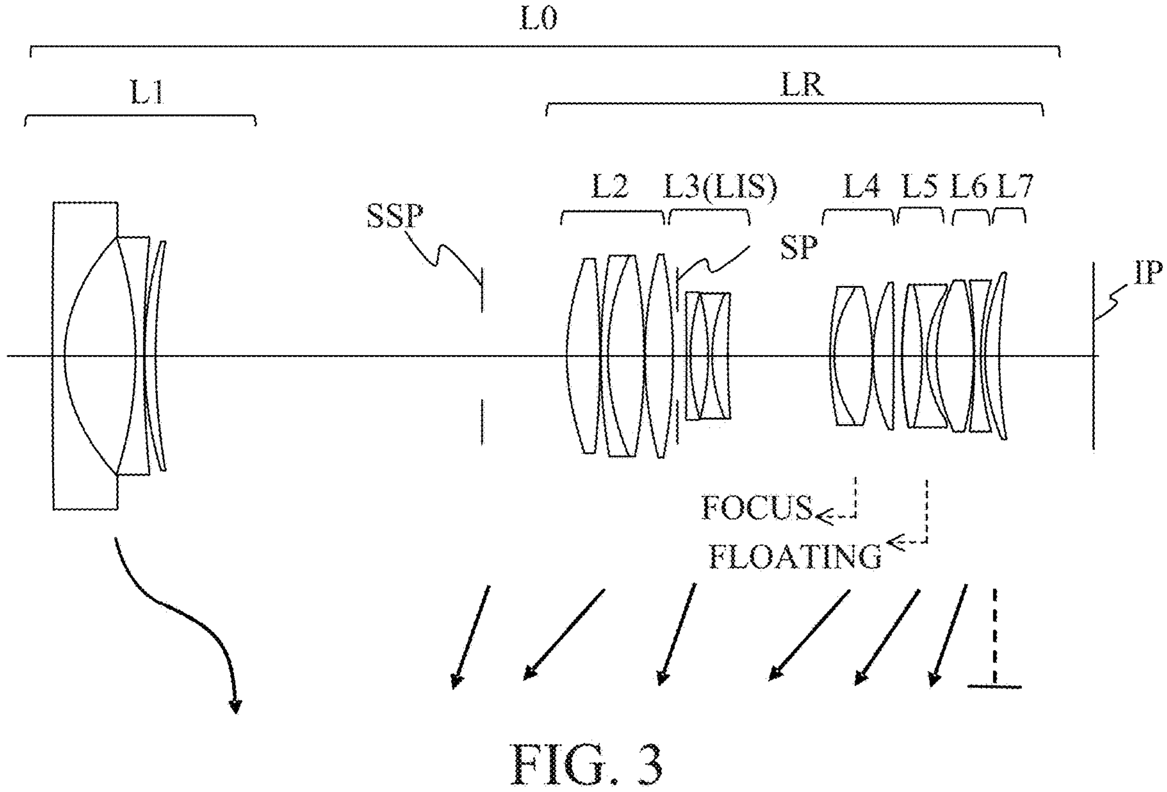
FIG. 3 is a sectional view of a zoom lens according to Example 2.
Figure 4A:
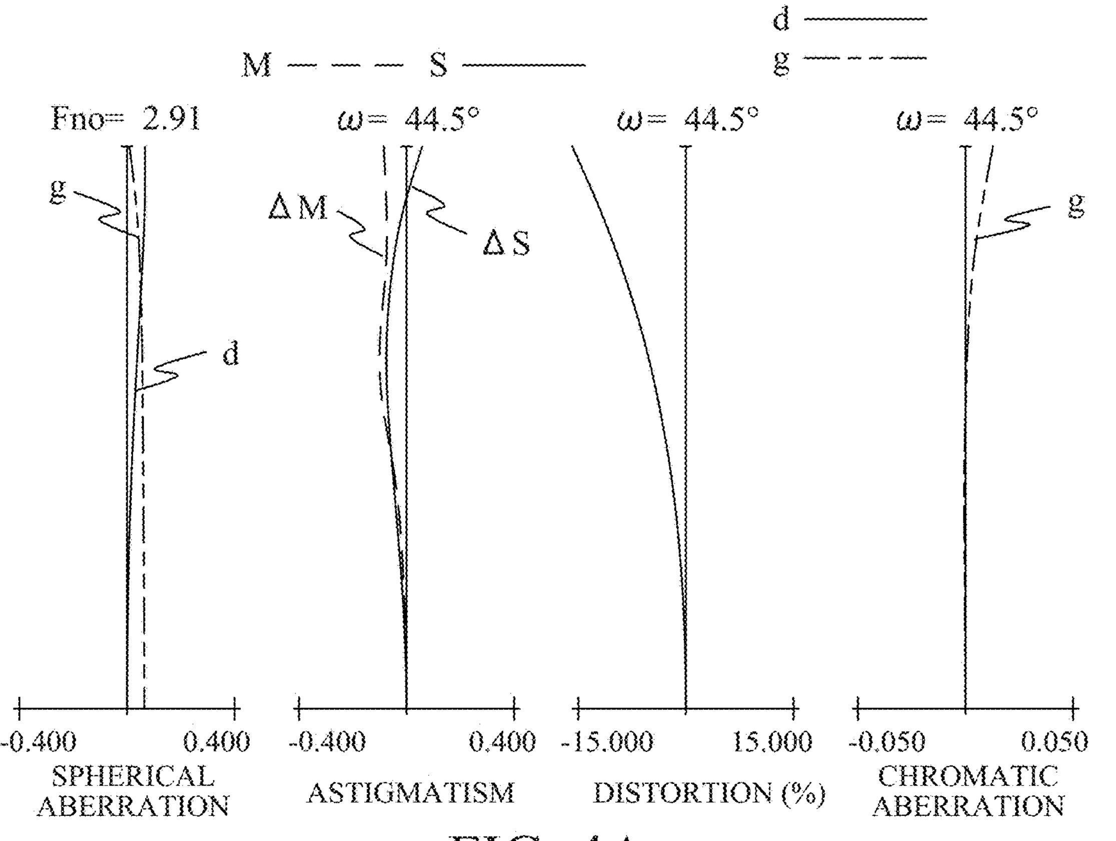
FIGS. 4A to 4C are aberration diagrams of the zoom lens according to Example 2.
Figure 4B:
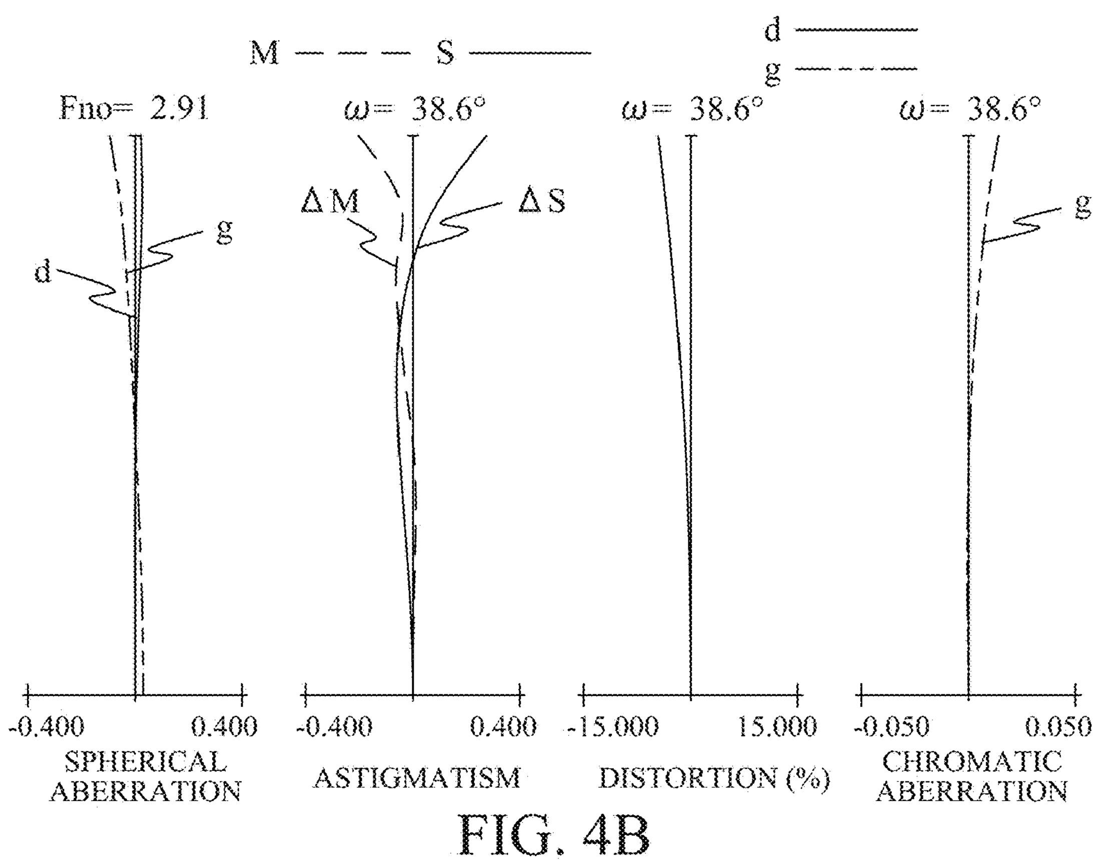
Figure 4C:
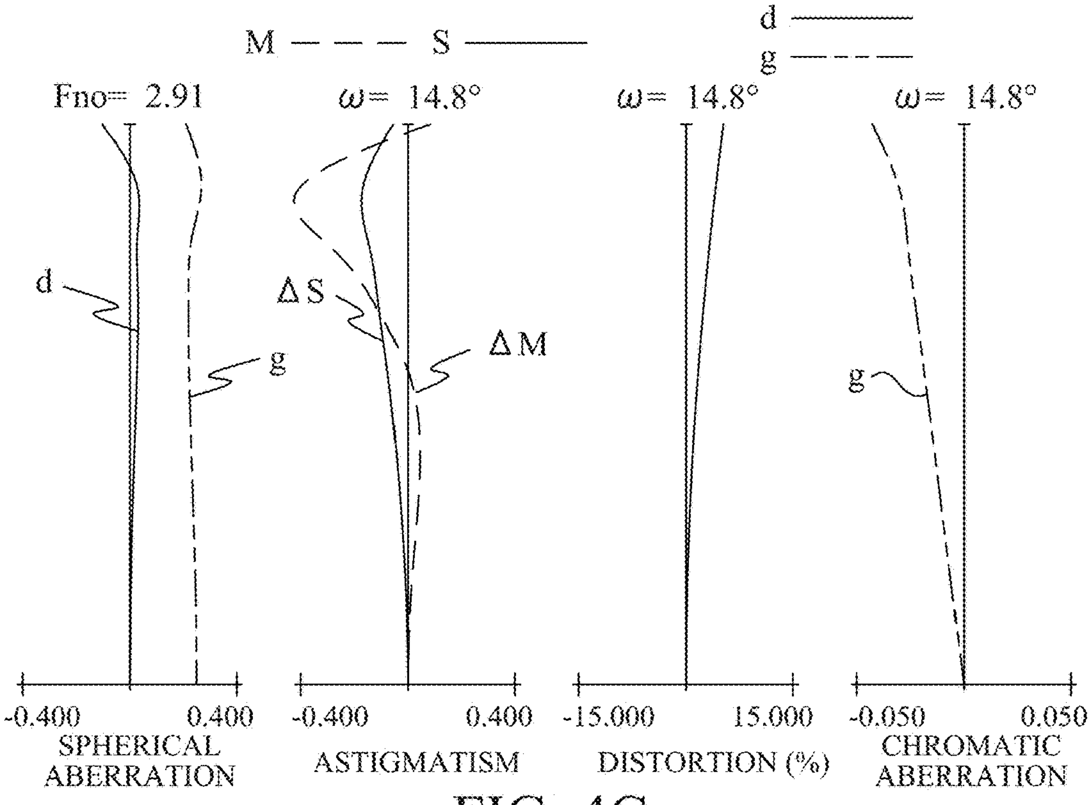
Figure 5:
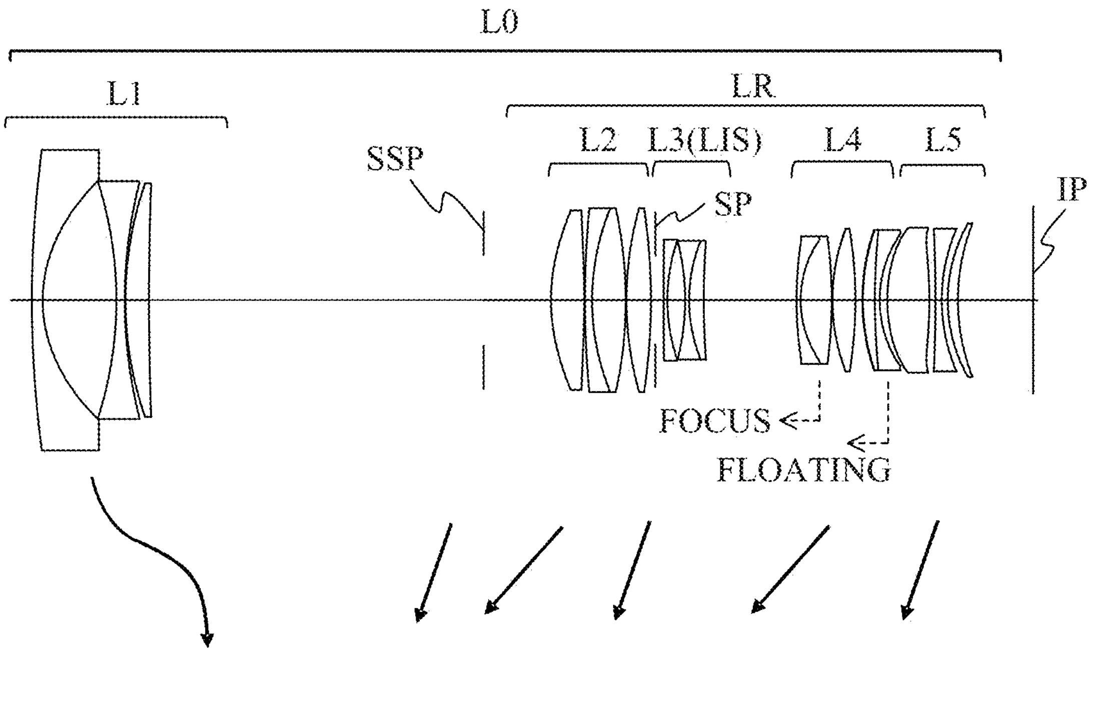
FIG. 5 is a sectional view of a zoom lens according to Example 3.
Figure 6A:
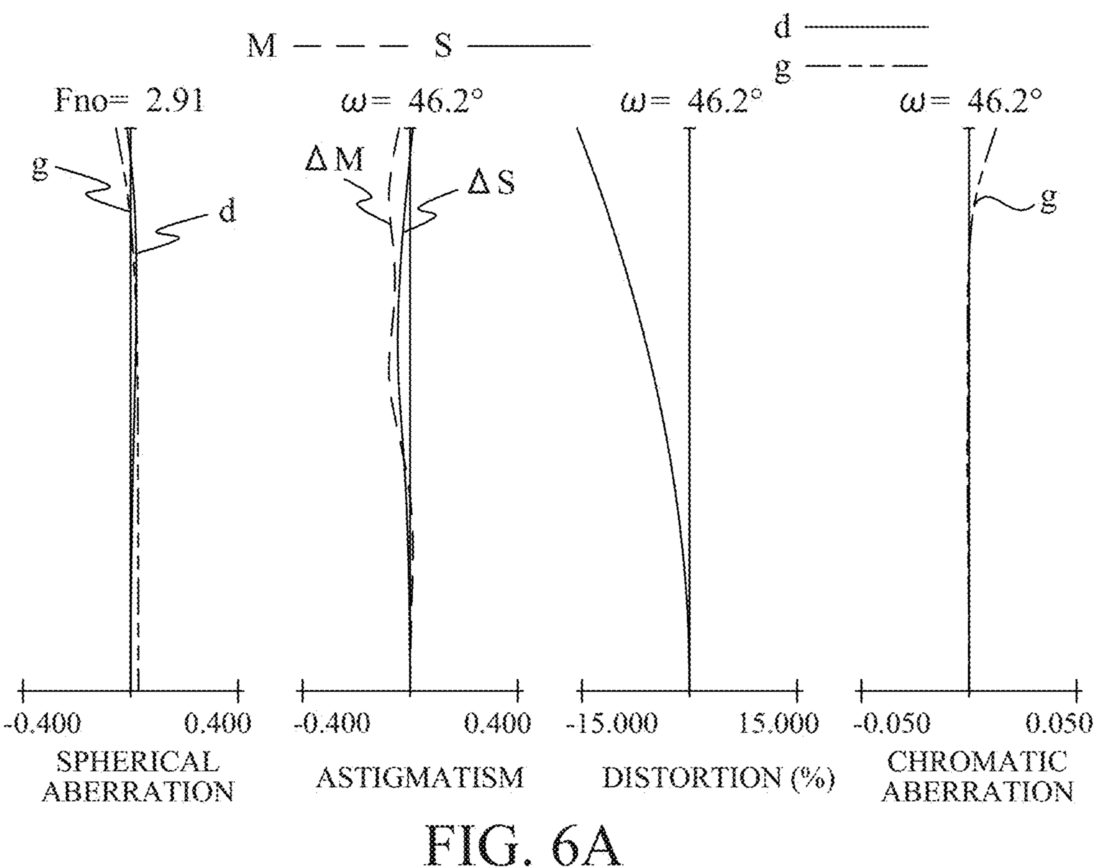
FIGS. 6A to 6C are aberration diagrams of the zoom lens according to Example 3.
Figure 6B:
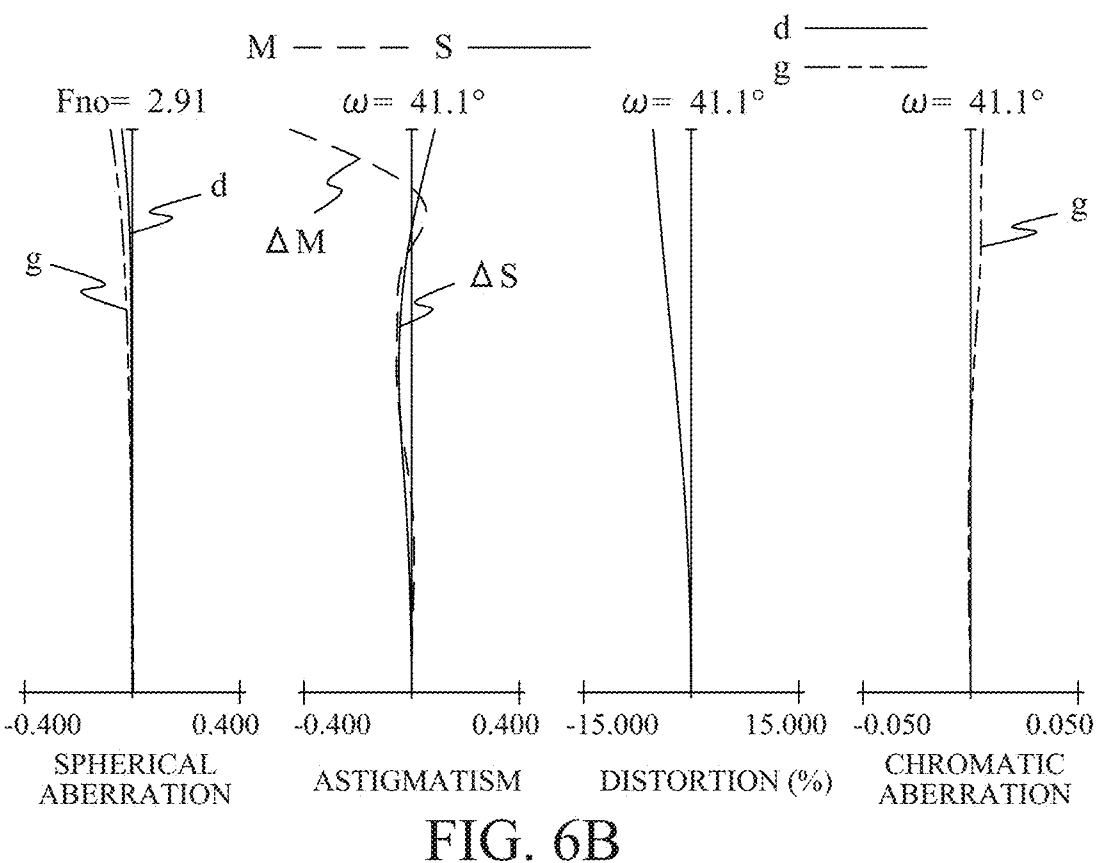
Figure 6C:
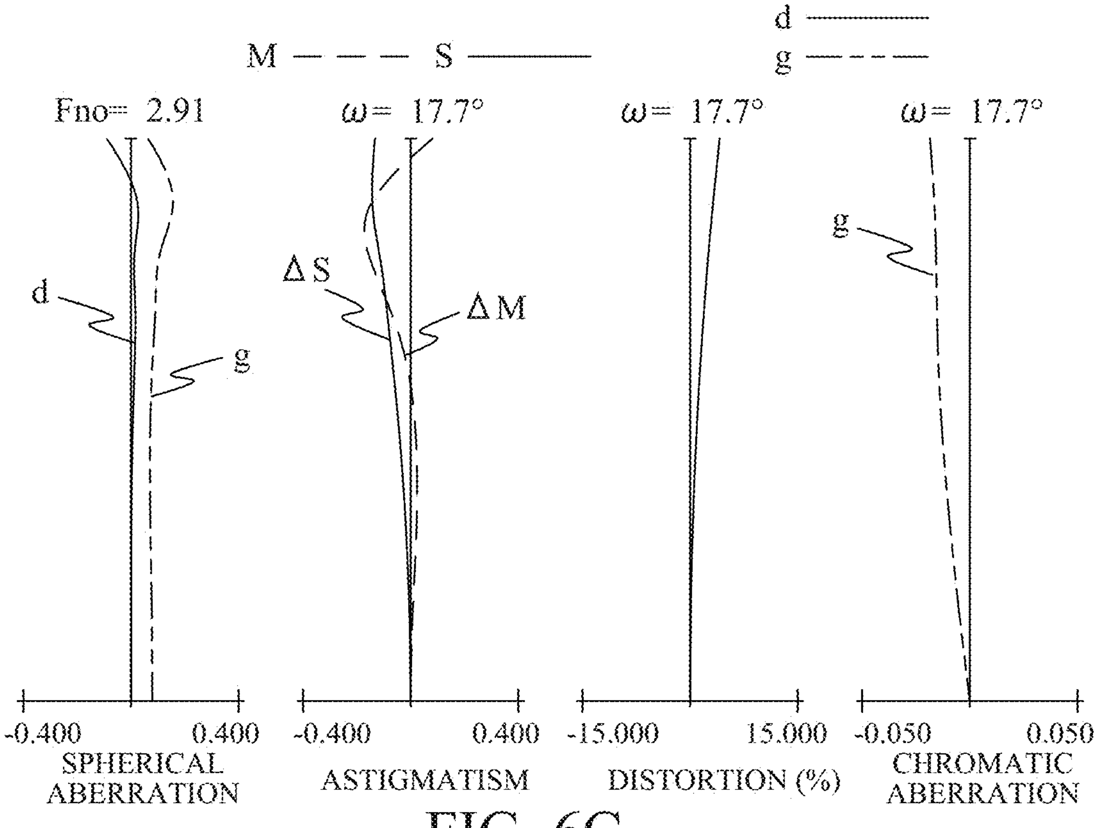
Figure 7:
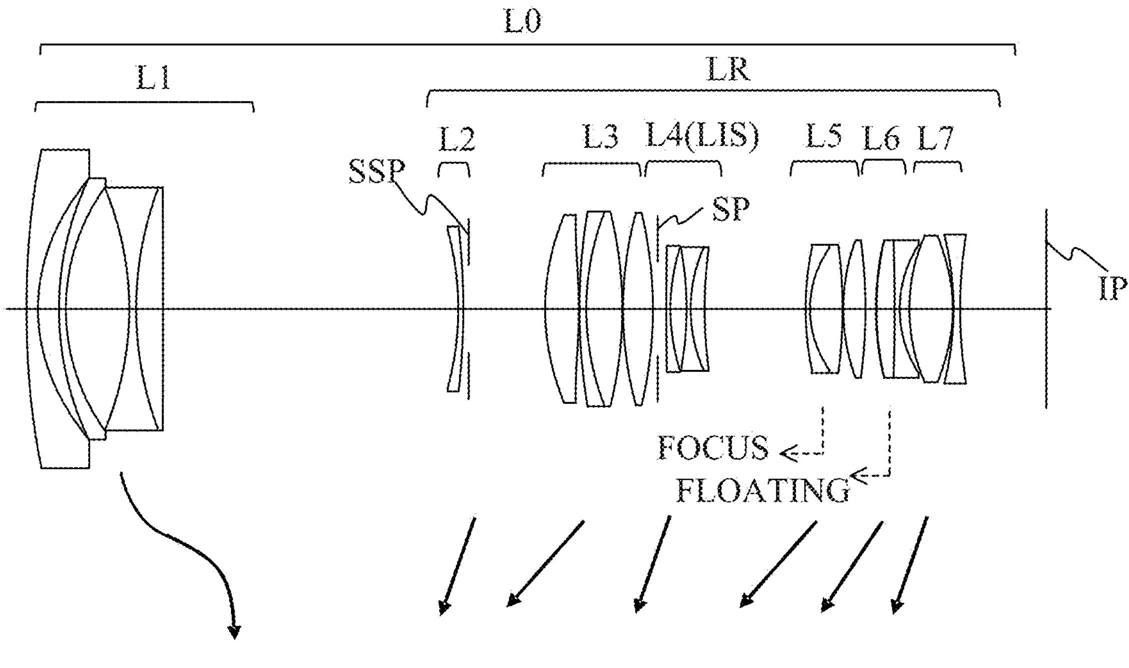
FIG. 7 is a sectional view of a zoom lens according to Example 4.
Figure 8A:
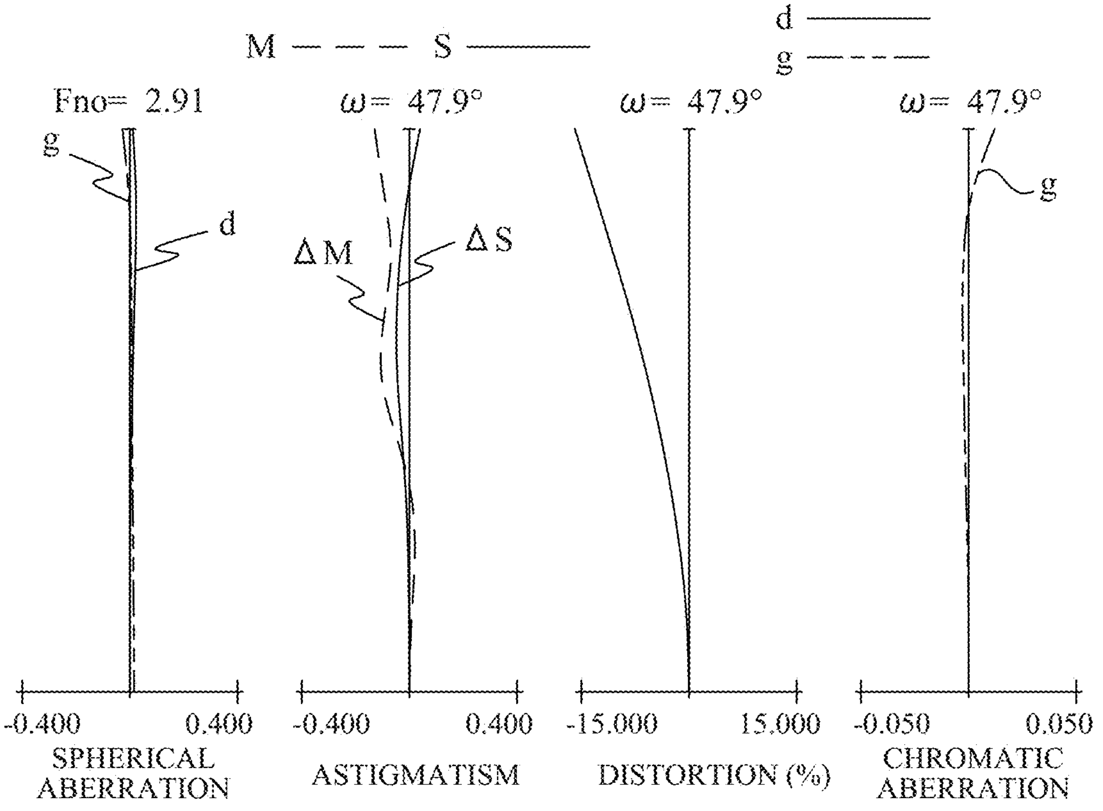
FIGS. 8A to 8C are aberration diagrams of the zoom lens according to Example 4.
Figures 8B, 8C:
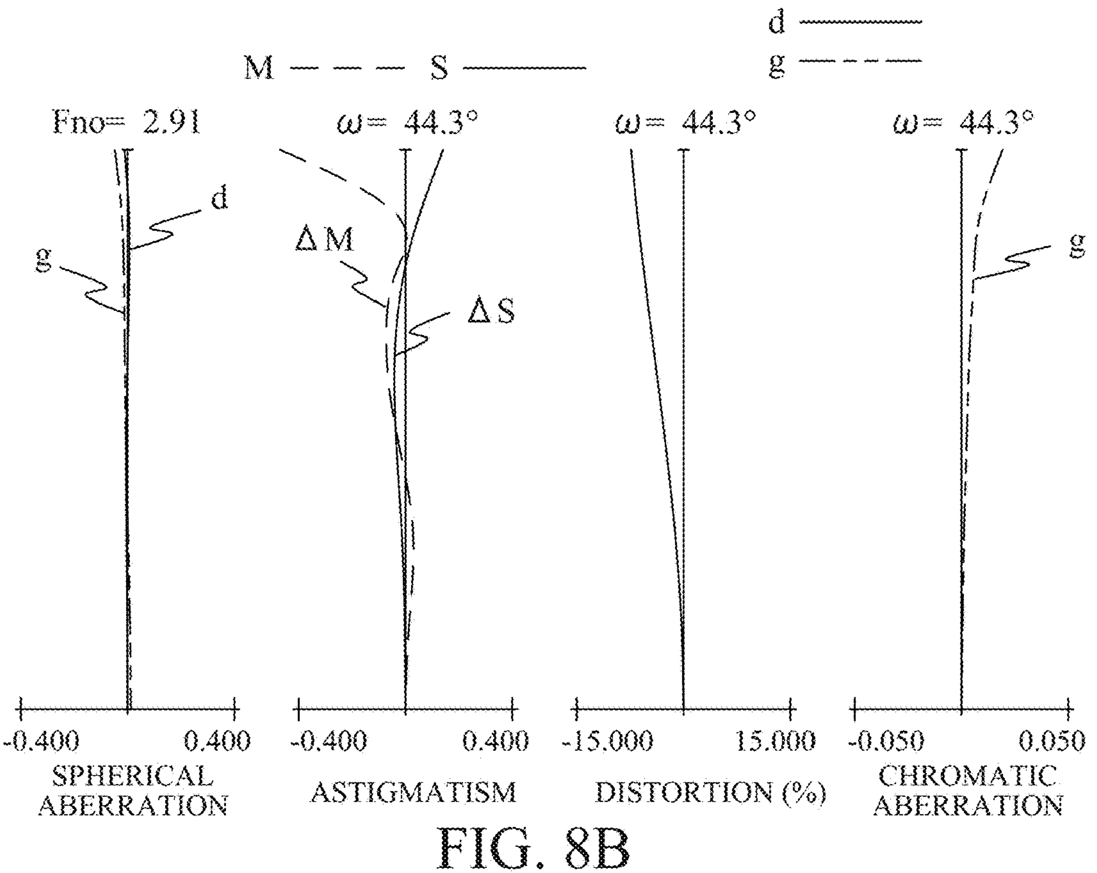
Figure 9:
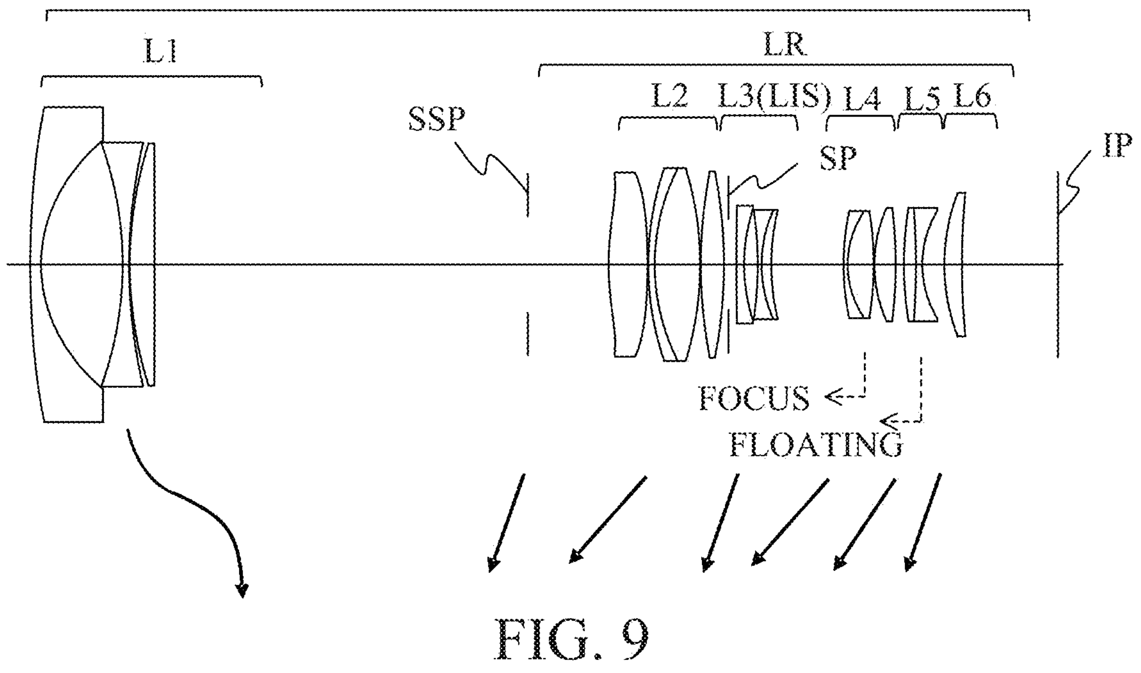
FIG. 9 is a sectional view of a zoom lens according to Example 5.
Figure 10A:
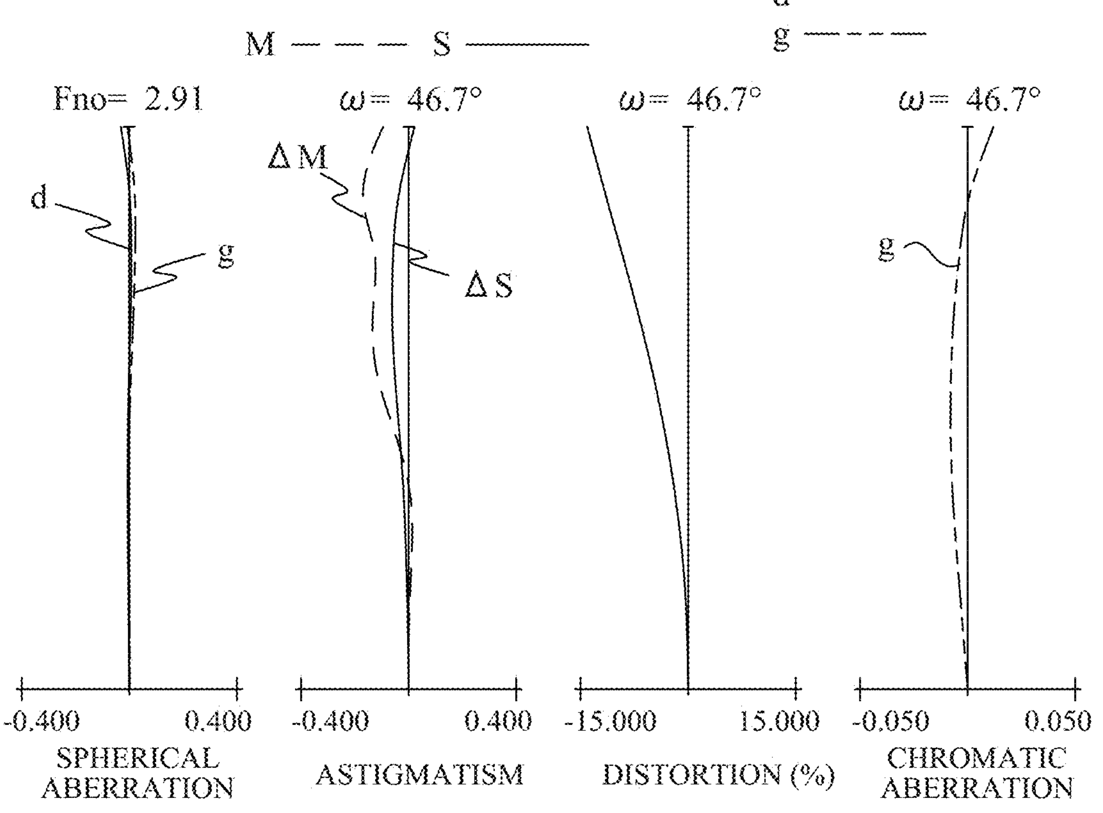
FIGS. 10A to 10C are aberration diagrams of the zoom lens according to Example 5.
Figures 10B, 10C:
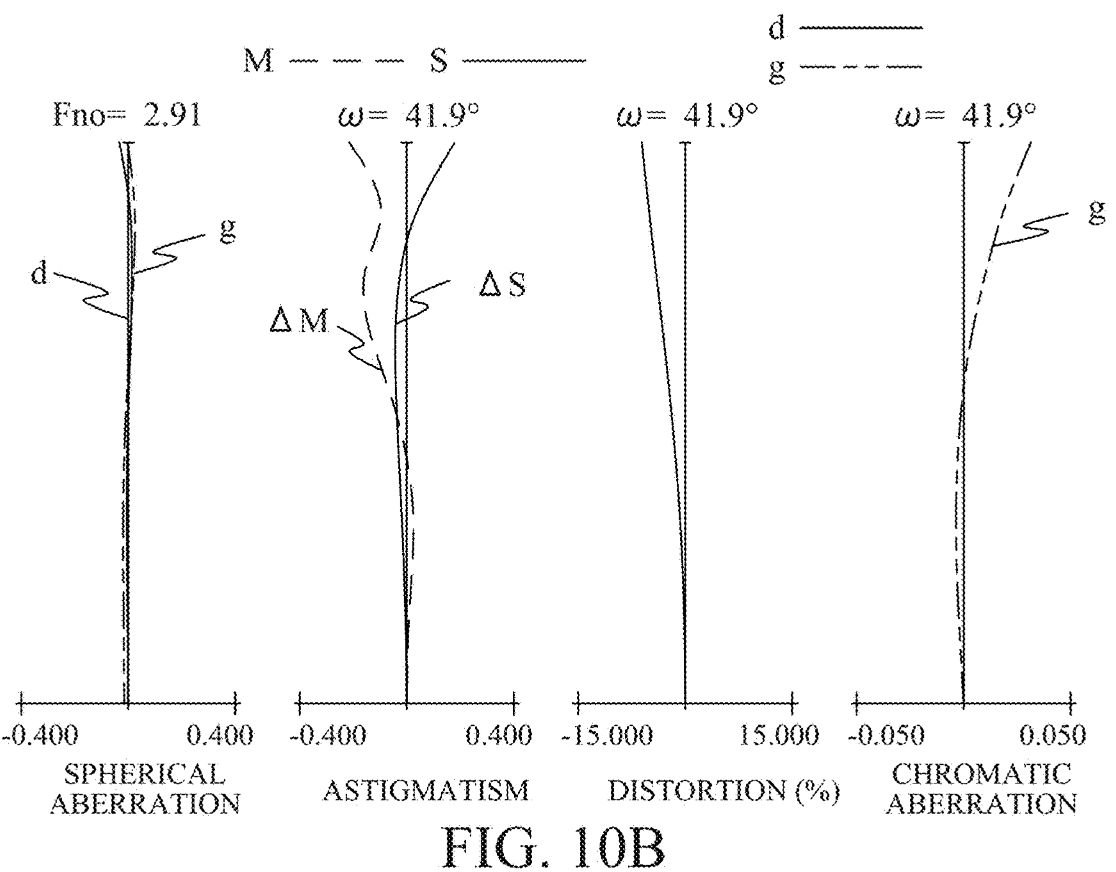
Figures 11, 12A:
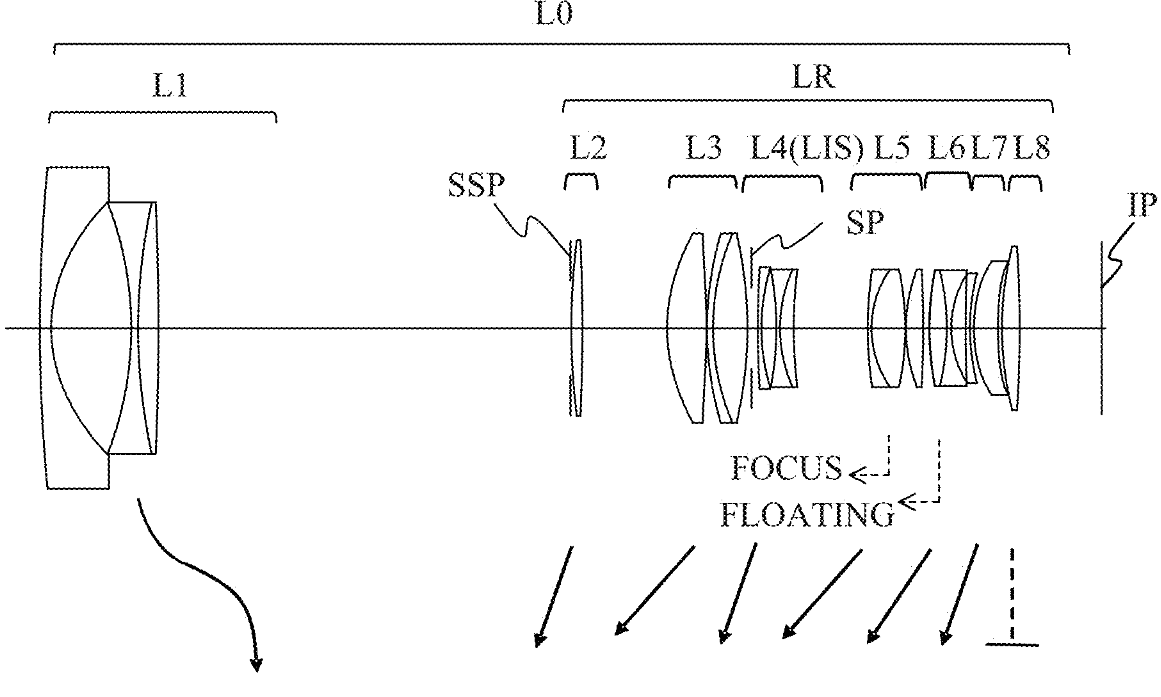
FIG. 11 is a sectional view of a zoom lens according to Example 6.
FIGS. 12A to 12C are aberration diagrams of the zoom lens according to Example 6.
Figures 12B, 12C:
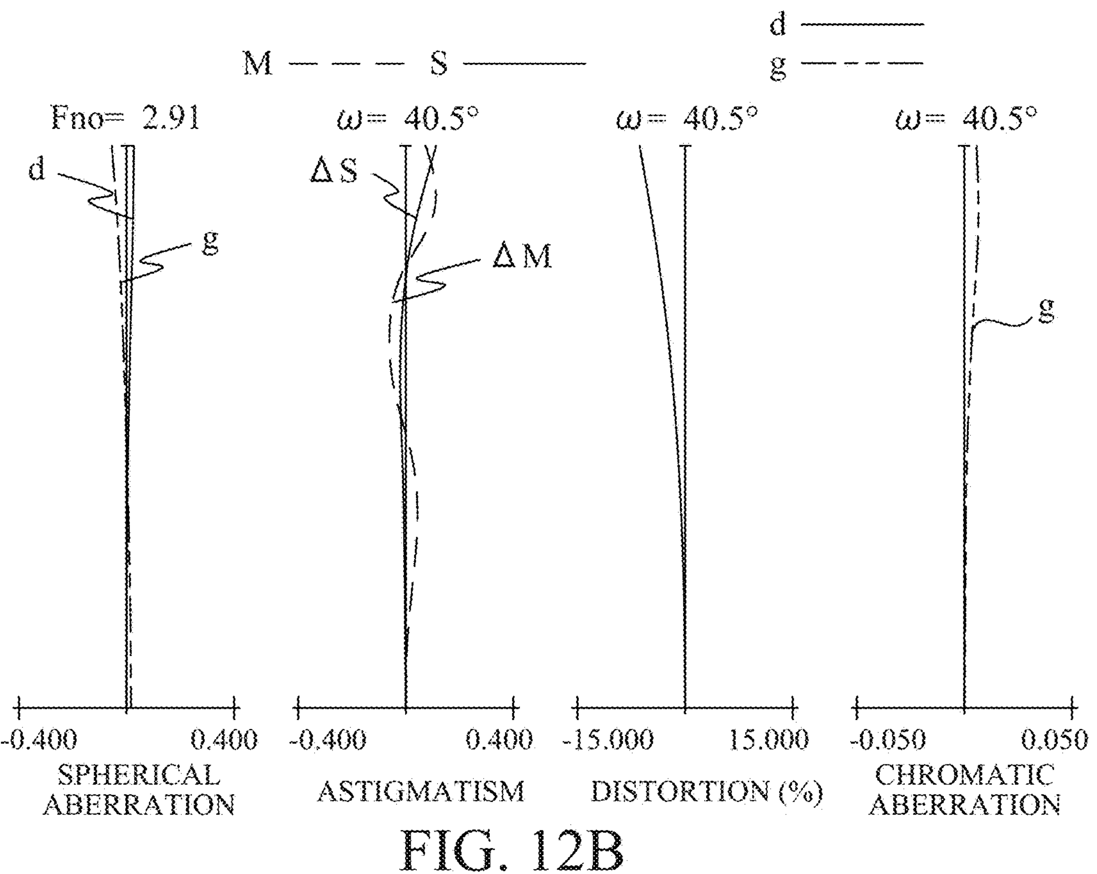

Referring now to the accompanying drawings, a description will be given of embodiments according to the disclosure.

FIGS. 1, 3, 5, 7, 9, and 11 illustrate the configurations of zoom lenses L0 according to Examples 1 to 6 at a wide-angle end in an in-focus state on an object at infinity (referred to as an in-focus state at infinity hereinafter). The zoom lens L0 according to each example is provided in an image pickup apparatus such as a digital video camera, a digital still camera, a broadcasting camera, a film-based camera, and a surveillance camera, or is used as an interchangeable lens that is attachable to and detachable from the image pickup apparatus.

In each figure, a left side is an object side and a right side is an image side. The zoom lens L0 according to each example includes a plurality of lens units. In a zoom lens, a lens unit is a group of one or more lenses that move together during zooming between a wide-angle end and a telephoto end. That is, a distance between adjacent lens units changes during zooming. The lens units may include an aperture stop (diaphragm). The wide-angle end and telephoto end respectively correspond to zoom states at the maximum angle of view (shortest focal length) and minimum angle of view (longest focal length) when the lens unit configured to move during zooming is located at both ends of a mechanically or controllably movable range on the optical axis.

In each figure, Li represents an i-th lens unit, where i is a natural number, counted from the object side among the lens units included in the zoom lens L0. LR represents a rear group including all lens units on the image side of the first lens unit L1. LIS represents an image stabilizing unit as a subunit configured to move in a direction including a directional component orthogonal to the optical axis of the zoom lens and has an image stabilizing function of reducing (correcting) image blur caused by camera shake due to hand shake or the like. The subunit represents a group of one or more lenses whose structural length (a distance from a lens surface closest to the object to a lens surface closest to the image plane of the subunit) does not change during zooming, and is one lens unit or a part of one lens unit.

SP represents an aperture stop, and SSP represents an auxiliary diaphragm that supplementally limits a light beam at a maximum aperture (minimum F-number (Fno)). IP represents an image plane. Disposed on the image plane IP is an imaging surface (light receiving surface) of a solid-state image sensor such as a CCD sensor or CMOS sensor in a digital still or video camera, or a film plane (photosensitive surface) of a film-based camera.

A solid arrow in each figure represents a moving locus of a lens unit configured to move during zooming from the wide-angle end to the telephoto end. A dashed arrow represents a moving locus of a lens unit configured to move during focusing from infinity to a close distance (a short distance).

The zoom lens L0 according to each example includes a first lens unit having negative refractive power and disposed closest to the object, and a rear group LR including three or more lens units and disposed on an image side of the first lens unit L1.

Each of the zoom lenses L0 according to Examples 1 and 2 includes a first lens unit L1, a second lens unit L2 having positive refractive power, a third lens unit L3 having negative refractive power, a fourth lens unit L4 having positive refractive power, a fifth lens unit L5 having negative refractive power, a sixth lens unit L6 having negative refractive power, and a seventh lens unit L7 having positive refractive power. In the zoom lenses L0 according to Examples 1 and 2, the second lens unit L2 to the seventh lens unit L7 are included in the rear group LR. During zooming from the wide-angle end to the telephoto end, the first lens unit L1 moves toward the image side, and the second lens unit L2 to the sixth lens unit L6 move toward the object side. The seventh lens unit L7 is fixed (does not move).

The zoom lens L0 according to Example 3 includes, in order from the object side to the image side, a first lens unit L1, a second lens unit L2 having positive refractive power, a third lens unit L3 having negative refractive power, a fourth lens unit L4 having positive refractive power, and a fifth lens unit L5 having negative refractive power. In the zoom lens L0 according to Example 3, the second lens unit L2 to the fifth lens unit L5 are included in the rear group LR. During zooming from the wide-angle end to the telephoto end, the first lens unit L1 moves toward the image side, and the second lens unit L2 to the fifth lens unit L5 move toward the object side.

The zoom lens L0 according to Example 4 includes the first lens unit L1, the second lens unit L2 having negative refractive power, the third lens unit L3 having positive refractive power, the fourth lens unit L4 having negative refractive power, the fifth lens unit L5 having positive refractive power, the sixth lens unit L6 having negative refractive power, and the seventh lens unit L7 having positive refractive power. In the zoom lens L0 according to Example 4, the second lens unit L2 to the seventh lens unit L7 are included in the rear group LR. During zooming from the wide-angle end to the telephoto end, the first lens unit L1 moves toward the image side, and the second lens unit L2 to the seventh lens unit L7 move toward the object side.

The zoom lens L0 according to Example 5 includes the first lens unit L1, the second lens unit L2 having positive refractive power, the third lens unit L3 having negative refractive power, the fourth lens unit L4 having positive refractive power, the fifth lens unit L5 having negative refractive power, and the sixth lens unit L6 having positive refractive power. In the zoom lens L0 according to Example 5, the second lens unit L2 to the sixth lens unit L6 are included in the rear group LR. During zooming from the wide-angle end to the telephoto end, the first lens unit L1 moves toward the image side, and the second lens unit L2 to the sixth lens unit L6 move toward the object side.

The zoom lens L0 according to Example 6 includes a first lens unit L1, a second lens unit L2 having positive refractive power, a third lens unit L3 having positive refractive power, a fourth lens unit L4 having negative refractive power, a fifth lens unit L5 having positive refractive power, a sixth lens unit L6 having negative refractive power, a seventh lens unit L7 having positive refractive power, and an eighth lens unit L8 having positive refractive power. In the zoom lens L0 according to Example 6, the second lens unit L2 to the eighth lens unit L8 are included in the rear group LR. During zooming from the wide-angle end to the telephoto end, the first lens unit L1 moves toward the image side, and the second lens unit L2 to the seventh lens unit L7 move toward the object side. The eighth lens unit L8 is fixed.

The zoom lens L0 according to each example is designed on the premise that distortion is allowed to occur and that image distortion caused by distortion is corrected by image processing technology. Thus, an image pickup apparatus using the zoom lens L0 according to each example as an imaging optical system corrects distortion of an electronic image obtained by imaging by electronic distortion correction as image processing based on a distortion amount (designed value) of the zoom lens L0.

Since distortion is permitted, a lens for correcting distortion is not required, and the zoom lens can easily have a reduced size and weight. In particular, the diameter of the first lens unit can be reduced by making the effective imaging range (effective image circle diameter) of the image sensor on the wide-angle side smaller than the effective imaging range on the telephoto end and by correcting distortion.

The zoom lens according to each example may include an optical member made of a parallel plate having substantially no refractive power, such as a low-pass filter or an infrared cut filter, between a lens disposed closest to the image plane and the image plane.

A description will now be given of the characteristic of the zoom lens L0 according to each example. The zoom lens L0 according to each example is a so-called negative lead type zoom lens in which the first lens unit L1 has negative refractive power. The rear group LR includes three or more lens units, and a distance changes between adjacent lens units during zooming and aberration fluctuations during zooming are suppressed.

In a zoom lens, generally, a high magnification varying ratio can be easily achieved by increasing a moving amount of each lens unit. In the negative lead type zoom lens, in a case where the rear group LR moves significantly toward the object side during zooming from the wide-angle end to the telephoto end, it becomes difficult to reduce the size of the zoom lens at the telephoto end. On the other hand, in a case where the first lens unit L1 moves significantly toward the image side during zooming from the wide-angle end to the telephoto end, the size of the zoom lens can be reduced at the telephoto end. Therefore, in order to achieve a high magnification varying ratio and a reduced size of the zoom lens, it is important to properly adjust the moving amount of the first lens unit L1.

In addition, negative lead type zoom lenses are known to have a configuration that is particularly effective for making zoom lenses wider-angle. Increasing the refractive power of the first lens unit L1 makes it easier to achieve a wider angle, but excessively strong refractive power of the first lens unit L1 causes the refractive power arrangement of the zoom lens to be asymmetric, and it becomes difficult to suppress aberration fluctuations during zooming. Therefore, in order to achieve a wider angle and high optical performance of the zoom lens, it is important to properly set the refractive power of the first lens unit L1.

Accordingly, in the zoom lens L0 according to each example, the moving amount and refractive power of the first lens unit L1 are properly set. More specifically, ML1 is a moving amount of the first lens unit L1 toward the image side during zooming from the wide-angle end to the telephoto end, TLt is an overall optical length of the zoom lens L0 at the telephoto end, fL1 is a focal length of the first lens unit L1, and ft is a focal length of the zoom lens L0 at the telephoto end. At this time, the zoom lens L0 according to each example satisfies the following inequalities (1) and (2). The sign of the moving amount of a lens unit is positive when that lens unit is located closer to the image plane at the telephoto end than at the wide-angle end. In other words, the sign of the moving amount of the lens unit configured to move toward the image side during zooming from the wide-angle end to the telephoto end is set positive. The overall optical length TLt is a distance on the optical axis from a lens surface of the zoom lens L0 closest to the object to the image plane IP.

$$0.30 \leq ML1/TLt \leq 0.90 \tag{1}$$

$$-0.80 \leq fL1/ft \leq -0.40 \tag{2}$$

Inequality (1) defines a proper relationship between the moving amount ML1 of the first lens unit L1 during zooming from the wide-angle end to the telephoto end and the overall optical length TLt at the telephoto end. In a case where the moving amount ML1 of the first lens unit L1 becomes too small so that ML1/TLt becomes lower than the lower limit of inequality (1), the rear group LR tends to move significantly toward the object side during zooming from the wide-angle end to the telephoto end, and it becomes difficult to reduce the size of the zoom lens L0 at the telephoto end. In a case where the moving amount ML1 of the first lens unit L1 increases so that ML1/TLt becomes higher than the upper limit of inequality (1), it becomes difficult to reduce the size of the zoom lens L0 at the wide-angle end.

Inequality (2) defines a proper relationship between the focal length fL1 of the first lens unit L1 and the focal length ft of the entire system of the zoom lens L0 at the telephoto end. Refractive power is expressed as a reciprocal of a focal length, and strong refractive power corresponds to a large value of the reciprocal of the focal length. In a case where the refractive power of the first lens unit L1 becomes too weak so that fL1/ft becomes lower than the lower limit of inequality (2), it becomes difficult to achieve a wide angle of view exceeding 90° at the wide-angle end. In addition, the diameter of the first lens unit L1 increases, and the zoom lens L0 becomes large in the radial direction. In a case where the refractive power of the first lens unit L1 becomes too strong so that fL1/ft becomes higher than the upper limit of inequality (2), the asymmetry of the refractive power arrangement of the zoom lens L0 becomes strong, and it becomes difficult to correct distortion at the wide-angle end.

The above configuration satisfying inequalities (1) and (2) can provide a zoom lens that has a reduced size, a wide angle of view, a high magnification varying ratio, and high optical performance.

In addition, the zoom lens L0 according to each example may satisfy one or more of the following inequalities (3) to (13). In these inequalities, Skw is a back focus of the zoom lens L0 at the wide-angle end, Skt is a back focus at the telephoto end, and TDL1 is a distance on the optical axis from a lens surface closest to the object of the first lens unit L1 to a lens surface closest to the image plane of the first lens unit L1. MLR1 is a moving amount toward the object side of a lens unit closest to the object of the rear group LR during zooming from the wide-angle end to the telephoto end. ndG1 is a refractive index for the d-line of a lens closest to the object in the zoom lens L0. fG1 is a focal length of a lens closest to the object in the zoom lens. βLRt is a lateral magnification of the rear group LR at the telephoto end. βLRw is a lateral magnification of the rear group LR at the wide-angle end. Ymax_w is a maximum image height of the zoom lens L0 at the wide-angle end in an in-focus state at infinity. Dist_w is a distortion amount at the maximum image height Ymax_w of the zoom lens L0 at the wide-angle end in an in-focus state at infinity.

$$-3.00 \leq ML1/fL1 \leq -1.00 \tag{3}$$

$$0.10 \leq Skw/ML1 \leq 0.60 \tag{4}$$

$$0.10 \leq Skt/ML1 \leq 0.70 \tag{5}$$

$$0.20 \leq TDL1/ML1 \leq 0.65 \tag{6}$$

$$-0.70 \leq MLR1/ML1 \leq -0.02 \tag{7}$$

$$-0.70 \leq MLR1/ft \leq -0.02 \tag{8}$$

$$1.50 \leq ndG1 \leq 2.00 \tag{9}$$

$$0.60 \leq fG1/fL1 \leq 2.00 \tag{10}$$

$$3.30 \leq \beta LRt/\beta LRw \leq 8.00 \tag{11}$$

$$-1.60 \leq \mathrm{Ymax\_w}/fL1 \leq -0.20 \tag{12}$$

$$-20.0 \leq \mathrm{Dist\_w} \leq -8.0 \tag{13}$$

Inequality (3) defines a proper relationship between the moving amount ML1 of the first lens unit L1 and the focal length fL1 of the first lens unit L1 during zooming from the wide-angle end to the telephoto end. In a case where the moving amount ML1 of the first lens unit L1 reduces so that ML1/fL1 becomes lower than the lower limit of inequality (3), the rear group LR tends to move significantly toward the object side during zooming from the wide-angle end to the telephoto end, and it becomes difficult to reduce the size of the zoom lens at the telephoto end. In a case where the moving amount ML1 of the first lens unit L1 increases so that ML1/fL1 becomes higher than the upper limit of inequality (3), it becomes difficult to reduce the size of the zoom lens at the wide-angle end.

Inequality (4) defines a proper relationship between the back focus Skw at the wide-angle end and the moving amount ML1 of the first lens unit L1 during zooming from the wide-angle end to the telephoto end. In a case where the back focus SKw reduces so that Skw/ML1 becomes lower than the lower limit of inequality (4), and it becomes difficult to dispose an optical member such as a low-pass filter near the image plane IP. In a case where the back focus SKw increases so that Skw/ML1 becomes higher than the upper limit of inequality (4), the overall optical length of the zoom lens L0 at the wide-angle end increases, and it becomes difficult to reduce the size of the zoom lens L0.

Inequality (5) defines a proper relationship between the back focus Skt at the telephoto end and the moving amount ML1 of the first lens unit L1 during zooming from the wide-angle end to the telephoto end. In a case where the back focus SKt reduces so that Skt/ML1 becomes lower than the lower limit of inequality (5), it becomes difficult to dispose an optical member such as a low-pass filter near the image plane IP. In a case where the back focus SKt increases so that Skt/ML1 becomes higher than the upper limit of inequality (5), the overall optical length of the zoom lens L0 at the telephoto end increases, and it becomes difficult to reduce the size of the zoom lens L0.

Inequality (6) defines a proper relationship between the distance TDL1, which is the thickness of the first lens unit L1, and the moving amount ML1 of the first lens unit L1 during zooming from the wide-angle end to the telephoto end. In a case where the distance TDL1 of the first lens unit L1 reduces so that TDL1/ML1 becomes lower than the lower limit of inequality (6), the size of the first lens unit L1 can reduce, but it becomes difficult to dispose an aberration correcting lens in the first lens unit L1. As a result, it becomes difficult to make the zoom lens L0 wider-angle. In a case where the distance TDL1 of the first lens unit L1 increases so that TDL1/ML1 becomes higher than the upper limit of inequality (6), the overall optical length of the zoom lens L0 increases, and it becomes difficult to reduce the size of the zoom lens L0.

Inequality (7) defines a proper relationship between the moving amount MLR1 of the lens unit closest to the object in the rear group LR and the moving amount ML1 of the first lens unit L1 during zooming from the wide-angle end to the telephoto end. In a case where the moving amount MLR1 of the rear group LR reduces so that MLR1/ML1 becomes lower than the lower limit of inequality (7), it becomes difficult to secure a high magnification varying ratio. In a case where the moving amount MLR1 of the rear group LR increases so that MLR1/ML1 becomes higher than the upper limit of inequality (7), it becomes difficult to achieve a high magnification varying ratio.

Inequality (8) defines a proper relationship between the moving amount MLR1 of the lens unit closest to the object in the rear group LR during zooming from the wide-angle end to the telephoto end and the focal length ft of the entire system at the telephoto end. In a case where the moving amount MLR1 of the rear group LR reduces so that MLR1/ft becomes lower than the lower limit of inequality (8), it becomes difficult to secure a high magnification varying ratio. In a case where the moving amount MLR1 of the rear group LR increases so that MLR1/ft becomes higher than the upper limit of inequality (8), the overall optical length of the zoom lens L0 at the telephoto end increases, and it becomes difficult to reduce the size of the zoom lens L0.

Inequality (9) defines a proper range for the refractive index ndG1 of the lens G1 closest to the object in the zoom lens L0. In a case where ndG1 becomes lower than the lower limit of inequality (9), the curvature of the lens G1 closest to the object increases, and it becomes difficult to correct curvature of field at the wide-angle end. In a case where ndG1 becomes higher than the upper limit of inequality (9), it becomes easy to correct curvature of field at the wide-angle end, but a low-dispersion glass material cannot be used for lens G1, and it becomes difficult to correct lateral chromatic aberration at the wide-angle end.

Inequality (10) defines a proper relationship between the focal length fG1 of the lens G1 closest to the object and the focal length fL1 of the first lens unit L1. In a case where the focal length fG1 of the lens G1 closest to the object reduces so that fG1/fL1 becomes lower than the lower limit of inequality (10), the diameter of the lens G1 becomes large, and it becomes difficult to reduce the size of the first lens unit L1. In a case where the focal length fG1 of the lens G1 closest to the object increases so that fG1/fL1 becomes higher than the upper limit of inequality (10), the refractive power of the lens G1 becomes too strong, and it becomes difficult to correct curvature of field at the wide-angle end.

Inequality (11) defines a proper relationship between the lateral magnification βLRt of the rear group LR at the telephoto end and the lateral magnification βLRw of the rear group LR at the wide-angle end. In a case where the lateral magnification βLRt of the rear group LR at the telephoto end reduces so that βLRt/βLRw becomes lower than the lower limit of inequality (11), it becomes difficult to secure a high magnification varying ratio. In a case where the lateral magnification βLRt of the rear group LR at the telephoto end increases so that βLRt/βLRw becomes higher than the upper limit of inequality (11), the refractive power of the rear group LR tends to increase, and it becomes difficult to suppress aberration fluctuations during zooming.

Inequality (12) defines a proper relationship between the maximum image height Ymax_w at the wide-angle end in-focus state at infinity and the focal length fL1 of the first lens unit L1. The maximum image height Ymax_w is the distance from the optical axis to an image point farthest from the optical axis among capturable image points, and is a maximum image height based on a magnification change caused by a distortion amount. A lens configuration and mechanical configuration suitable for this maximum image height provide the zoom lens L0 with a reduced size and weight. In a case where the maximum image height reduces so that Ymax_w/fL1 becomes lower than the lower limit of inequality (12), a necessary imaging angle of view cannot be secured. In a case where the maximum image height increases so that Ymax_w/fL1 becomes higher than the upper limit of inequality (12), light rays from an angle of view wider than the necessary imaging angle of view are imaged on the image plane IP, and the lens configuration and mechanical configuration become large, and it becomes difficult to provide the zoom lens L0 with a reduced size and weight.

Inequality (13) defines a proper range of the distortion amount Dist_w at the maximum image height Ymax_w at the wide-angle end in-focus state at infinity. In a case where Dist_w becomes lower than the lower limit of inequality (13), it becomes difficult to suppress deterioration of image quality in a peripheral area by the electronic distortion correction. In a case where Dist_w becomes higher than the upper limit of inequality (13), a distortion amount in the equidistant projection method increases, and it causes significant deterioration of image quality in the peripheral area during image stabilization or an insufficient image stabilizing amount in the peripheral area.

The distortion amount Dist_w [%] at an arbitrary image height at the wide-angle end is expressed as follows:

$$\text{Dist\_w } [\%] = \{(yp - y)/y1\} \times 100$$

where y is an ideal image height in the central projection method for the zoom lens L0, and yp is an actual image height.

An ideal image height y in the central projection method is a value defined as follows:

$$y=f\tan\theta i$$

where f is a focal length of the zoom lens, and θi is a half angle of view of an actual light ray at the arbitrary image height.

An ideal image height y can be expressed as follows:

$$y=f\tan\theta$$

where f is a focal length of the zoom lens, and θ is a half angle of view of the actual light at the maximum image height:

Inequalities (1) to (13) may be replaced with inequalities (1a) to (13a) below:

$$0.31 \le ML1/TLt \le 0.70 \tag{1a}$$

$$-0.75 \le fL1/ft \le -0.43 \tag{2a}$$

$$-2.50 \le ML1/fL1 \le -1.20 \tag{3a}$$

$$0.15 \le Skw/ML1 \le 0.50 \tag{4a}$$

$$0.15 \le Skt/ML1 \le 0.60 \tag{5a}$$

$$0.25 \le TDL1/ML1 \le 0.60 \tag{6a}$$

$$-0.60 \le MLR1/ML1 \le -0.04 \tag{7a}$$

$$-0.60 \le MLR1/ft \le -0.04 \tag{8a}$$

$$1.55 \le ndG1 \le 1.95 \tag{9a}$$

$$0.80 \le fG1/fL1 \le 1.70 \tag{10a}$$

$$3.40 \le \beta LRt/\beta LRw \le 6.00 \tag{11a}$$

$$-1.30 \le \text{Ymax\_w}/fL1 \le -0.30 \tag{12a}$$

$$-19.0 \le \text{Dist\_w} \le -10.0 \tag{13a}$$

Inequalities (1) to (13) may be replaced with inequalities (1b) to (13b) below:

$$0.32 \le ML1/TLt \le 0.60 \tag{1b}$$

$$-0.70 \le fL1/ft \le -0.45 \tag{2b}$$

$$-2.30 \le ML1/fL1 \le -1.40 \tag{3b}$$

$$0.20 \le Skw/ML1 \le 0.40 \tag{4b}$$

$$0.20 \le Skt/ML1 \le 0.50 \tag{5b}$$

$$0.30 \le TDL1/ML1 \le 0.55 \tag{6b}$$

$$-0.50 \le MLR1/ML1 \le -0.06 \tag{7b}$$

$$-0.50 \le MLR1/ft \le -0.06 \tag{8b}$$

$$1.60 \le ndG1 \le 1.90 \tag{9b}$$

$$1.00 \le fG1/fL1 \le 1.50 \tag{10b}$$

$$3.50 \le \beta LRt/\beta LRw \le 5.00 \tag{11b}$$

$$-1.00 \le \text{Ymax\_w}/fL1 \le -0.40 \tag{12b}$$

$$-17.0 \le \text{Dist\_w} \le -12.0 \tag{13b}$$

A configuration that may be satisfied by the zoom lens L0 according to each example will be described.

The first lens unit L1 may include two or more negative lenses and one or more positive lenses. Thereby, the zoom lens L0 can easily have a sufficiently wide angle of view (for example, an angle of view of 90° or more at the wide-angle end) and a sufficient magnification varying ratio (for example, about 3 times).

An auxiliary diaphragm SSP may be disposed on the image side of the first lens unit L1. In a case where excess off-axis light beams are shielded within a range that properly secures optical specifications such as an F-number and a peripheral light amount, excess off-axis coma and flare components are cut, and it becomes easy to obtain high optical performance.

The rear group LR may include an aperture stop SP and a focus lens unit that moves on the optical axis on the image side of the aperture stop SP for focusing from an object at infinity to an object at a close distance. In a negative lead type zoom lens, the diameter of the lens on the image side of the aperture stop SP tends to be smaller. Thus, by using the lens unit on the image side of the aperture stop SP as the focus lens unit, it becomes easier to reduce the diameter and weight of the focus lens unit.

Reducing the weight of the focus lens unit can provide faster focusing. A so-called floating method may be used in which a plurality of lens units are independently moved during focusing to correct aberration fluctuations. In each figure, dashed arrows indicate a moving direction of a first focus lens unit (FOCUS), which mainly performs focusing, and a moving direction of a second focus lens unit (FLOATING), which acts as a floating unit, during focusing from an object at infinity to an object at a close distance.

During focusing from an object at infinity to an object at a close distance at the wide-angle end, both of the first focus lens unit having positive refractive power and the second focus lens unit having negative refractive power move toward the object side, so that curvature of field caused by the movement of the first focus lens unit can be effectively corrected. During focusing from an object at infinity to an object at a close distance at the telephoto end, both the first focus lens unit having positive refractive power and the second focus lens unit having negative refractive power move toward the image side, so that spherical aberration caused by the movement of the first focus lens unit can be effectively corrected.

The rear group LR may include an aperture stop SP and an image stabilizing unit LIS on the image side of the aperture stop SP. As described above, in the negative lead type zoom lens, the diameter of the lens on the image side of the aperture stop SP tends to be smaller. Thus, providing an image stabilizing unit on the image side of the aperture stop SP can easily reduce the diameter of the image stabilizing unit and the size of the zoom lens.

The rear group LR may include four or more lens units, and distances between these lens units are changed during zooming. Moving many lens units during zooming can easily achieve a high magnification varying ratio while suppressing aberration fluctuations during zooming.

A description will now be given of numerical examples 1 to 6 corresponding to Examples 1 to 6, respectively. In surface data in each numerical example, a surface number m represents the order of the surface counted from the object side. r (mm) represents a radius of curvature of an m-th surface, and d (mm) represents a distance on the optical axis between m-th and (m+1)-th surfaces. nd is a refractive index for the d-line of the optical material between the m-th surface and the (m+1)-th surface, and νd is an Abbe number of the optical member based on the d-line. The Abbe number vd based on the d-line is expressed as follows:

$$vd=(Nd-1)/(NF-NC)$$

where Nd, NF, and NC are refractive indices for the d-line (587.6 nm), F-line (486.1 nm), and C-line (656.3 nm) in the Fraunhofer lines, respectively.

In each numerical example, all of d, focal length (mm), F-number (Fno), and half angle of view (°) are values in a case where the optical system according to each example is in an in-focus state on an object at infinity. A "back focus (BF)" is a distance on the optical axis from a final lens surface (a lens surface closest to the image plane) to a paraxial image plane expressed in air-equivalent length. An "overall lens length" is a distance on the optical axis from the foremost lens surface (a lens surface closest to the object) of the optical system to the final surface plus the back focus. A "lens unit" includes one or more lenses. SP represents an aperture stop and SSP represents an auxiliary diaphragm. WIDE, MIDDLE, and TELE represent a wide-angle end, an intermediate zoom position, and a telephoto end, respectively.

An asterisk "*" attached to the right side of a surface number means that the optical surface is aspheric. The aspherical shape is expressed as follows:

$$X=(h^2/R)/\left[1+\{1-(1+K)(h/R)^2\}^{1/2}\right]+A4\times h^4+A6\times h^6+A8\times h^8+A10\times h^{10}+A12\times h^{12}+A14\times h^{14}$$

where X is a displacement amount from the surface vertex in the optical axis direction, h is a height from the optical axis in the direction perpendicular to the optical axis, R is a paraxial radius of curvature, K is a conical constant, and A4, A6, A8, A10, A12, and A14 are aspherical coefficients of each order. "e±XX" in each of a conical constant and an aspherical coefficient means "$\times 10^{\pm XX}$"

Table 1 summarizes values of inequalities (1) to (13) in each numerical example.

FIGS. 2A to 2C, 4A to 4C, 6A to 6C, 8A to 8C, 10A to 10C, and 12A to 12C respectively illustrate longitudinal aberrations (spherical aberration, astigmatism, distortion, and chromatic aberration) of the zoom lenses L0 according to Examples 1 to 6 in an in-focus state at infinity. FIGS. 2A, 4A, 6A, 8A, 10A, and 12A correspond to a wide-angle end, FIGS. 2B, 4B, 6B, 8B, 10B, and 12B correspond to an intermediate zoom position, and FIGS. 2C, 4C, 6C, 8C, 10C, and 12C correspond to a telephoto end. In the spherical aberration diagram, Fno represents an F-number. A solid line represents a spherical aberration amount for the d-line (wavelength 587.6 nm), and a long and two short dashes line represents a spherical aberration amount for the g-line (wavelength 435.8 nm). In the astigmatism diagram, a solid line S represents an astigmatism amount on a sagittal image plane, and a dashed line M represents an astigmatism amount on a meridional image plane. The distortion diagram illustrates a distortion amount for the d-line. The chromatic aberration diagram illustrates a lateral chromatic aberration amount for the g-line. @ represents a half angle of view (°) and is calculated by paraxial calculation.

Numerical Example 1

UNIT: mm

SURFACE DATA

| Surface No. | r | d | nd | vd |
|---|---|---|---|---|
| 1* | 242.726 | 2.80 | 1.76450 | 49.1 |
| 2* | 29.264 | 16.63 | | |
| 3 | −102.881 | 1.93 | 1.59282 | 68.6 |
| 4 | 165.819 | 0.15 | | |
| 5 | 77.144 | 4.03 | 1.85478 | 24.8 |
| 6 | 206.650 | (Variable) | | |
| 7 (SSP) | ∞ | (Variable) | | |
| 8* | 41.279 | 7.23 | 1.43875 | 94.7 |
| 9* | −451.775 | 0.15 | | |
| 10 | 236.296 | 1.65 | 1.92286 | 20.9 |
| 11 | 55.085 | 7.89 | 1.59410 | 60.5 |
| 12 | −87.978 | 0.15 | | |
| 13 | 83.230 | 5.67 | 1.76385 | 48.5 |
| 14 | −121.202 | (Variable) | | |
| 15 (SP) | ∞ | 1.89 | | |
| 16 | 1097.825 | 0.90 | 1.90043 | 37.4 |
| 17 | 41.859 | 4.65 | | |
| 18 | −45.079 | 0.90 | 1.51633 | 64.1 |
| 19 | 39.006 | 3.61 | 1.94594 | 18.0 |
| 20 | 398.286 | (Variable) | | |
| 21 | 94.219 | 0.95 | 2.00069 | 25.5 |
| 22 | 25.681 | 7.47 | 1.59282 | 68.6 |
| 23 | −86.884 | 0.15 | | |
| 24 | 44.243 | 5.51 | 1.72916 | 54.7 |
| 25 | −111.090 | (Variable) | | |
| 26* | 50.264 | 0.10 | 1.58946 | 30.6 |
| 27 | 50.062 | 2.94 | 1.95906 | 17.5 |
| 28 | 186.552 | 1.10 | 1.91650 | 31.6 |
| 29 | 26.116 | (Variable) | | |
| 30* | 34.054 | 8.25 | 1.49700 | 81.5 |
| 31* | −69.508 | 1.84 | | |
| 32 | −147.633 | 1.45 | 2.05090 | 26.9 |
| 33 | 45.813 | (Variable) | | |
| 34 | 44.999 | 2.57 | 1.48749 | 70.2 |
| 35 | 74.289 | (Variable) | | |
| Image Plane | ∞ | | | |

ASPHERIC DATA

1st Surface
K = 0.00000e+00 A 4 = 3.79588e−07 A 6 = −2.27532e−09
A 8 = 2.92521e−12 A10 = −2.13577e−15 A12 = 8.85820e−19
A14 = −1.44892e−22
2nd Surface
K = −7.96207e−01 A 4 = 1.27192e−06 A 6 = −9.24583e−10
A 8 = −6.92163e−12 A10 = 2.08893e−14 A12 = −2.71465e−17
A14 = 1.48411e−20
8th Surface
K = 0.00000e+00 A 4 = −3.63424e−06 A 6 = −2.97745e−09
A 8 = 1.44009e−11 A10 = −3.40286e−14 A12 = 2.73183e−17
9th Surface
K = 0.00000e+00 A 4 = 2.58421e−06 A 6 = −2.26679e−09
A 8 = 8.41630e−12 A10 = −1.71199e−14 A12 = 1.08873e−17
26th Surface
K = 0.00000e+00 A 4 = −5.59365e−07 A 6 = 5.88351e−09
A 8 = −6.10866e−11 A10 = 3.18393e−13 A12 = −4.95532e−16
30th Surface
K = 0.00000e+00 A 4 = −6.51081e−06 A 6 = 1.02555e−08
A 8 = 2.48159e−11 A10 = −3.73842e−13 A12 = 1.25642e−15
31st Surface
K = 0.00000e+00 A 4 = −3.25242e−06 A 6 = 1.31246e−08
A 8 = 1.30698e−12 A10 = −2.83566e−13 A12 = 1.21551e−15

VARIOUS DATA

ZOOM RATIO 3.87

| | WIDE | MIDDLE | TELE |
|---|---|---|---|
| Focal Length | 17.54 | 23.77 | 67.88 |
| Fno | 2.91 | 2.91 | 2.91 |

-continued

| UNIT: mm | | | |
|---|---|---|---|
| Half Angle of View (°) | 46.11 | 42.31 | 17.68 |
| Image Height | 18.23 | 21.64 | 21.64 |
| Overall Lens Length | 223.96 | 196.29 | 164.01 |
| BF | 18.22 | 18.22 | 18.22 |
| d6 | 72.62 | 44.66 | 5.04 |
| d7 | 14.29 | 11.41 | -3.05 |
| d14 | 1.00 | 3.88 | 18.34 |
| d20 | 20.20 | 17.75 | 1.49 |
| d25 | 1.53 | 1.49 | 3.65 |
| d29 | 2.57 | 5.06 | 19.15 |
| d33 | 1.00 | 1.28 | 8.61 |
| d35 | 18.22 | 18.22 | 18.22 |

LENS UNIT DATA

| Lens Unit | Starting Surface | Focal Length |
|---|---|---|
| 1 | 1 | −38.24 |
| 2 | 8 | 34.71 |
| 3 | 15 | −42.21 |
| 4 | 21 | 40.21 |
| 5 | 26 | −67.57 |
| 6 | 30 | −197.70 |
| 7 | 34 | 227.58 |

Numerical Example 2

UNIT: mm

SURFACE DATA

| Surface No. | r | d | nd | νd |
|---|---|---|---|---|
| 1* | 1481.982 | 2.80 | 1.61881 | 63.9 |
| 2* | 32.472 | 16.41 | | |
| 3 | −87.899 | 1.93 | 1.59282 | 68.6 |
| 4 | 290.632 | 0.15 | | |
| 5 | 94.000 | 2.56 | 2.00100 | 29.1 |
| 6 | 153.396 | (Variable) | | |
| 7 (SSP) | ∞ | (Variable) | | |
| 8* | 54.092 | 7.72 | 1.43875 | 94.7 |
| 9* | −174.950 | 0.15 | | |
| 10 | 136.197 | 1.65 | 1.92286 | 20.9 |
| 11 | 57.312 | 8.41 | 1.59282 | 68.6 |
| 12 | −124.631 | 0.15 | | |
| 13 | 89.754 | 6.49 | 1.76385 | 48.5 |
| 14 | −127.220 | (Variable) | | |
| 15 (SP) | ∞ | 2.14 | | |
| 16 | −701.038 | 0.90 | 1.91082 | 35.2 |
| 17 | 49.509 | 4.12 | | |
| 18 | −56.142 | 0.90 | 1.59282 | 68.6 |
| 19 | 37.069 | 3.63 | 1.94594 | 18.0 |
| 20 | 192.263 | (Variable) | | |
| 21 | 73.173 | 0.95 | 1.92286 | 20.9 |
| 22 | 27.330 | 8.84 | 1.59282 | 68.6 |
| 23 | −58.806 | 0.15 | | |
| 24 | 42.146 | 4.73 | 1.69680 | 55.5 |
| 25 | −1571.412 | (Variable) | | |
| 26* | 90.425 | 0.10 | 1.58946 | 30.6 |
| 27 | 95.358 | 4.58 | 1.95906 | 17.5 |
| 28 | −70.903 | 1.10 | 1.91650 | 31.6 |
| 29 | 27.596 | (Variable) | | |
| 30* | 38.213 | 8.66 | 1.49700 | 81.5 |
| 31* | −65.399 | 0.16 | | |
| 32 | −139.896 | 1.45 | 2.05090 | 26.9 |
| 33 | 64.298 | (Variable) | | |
| 34 | 49.387 | 3.26 | 1.69680 | 55.5 |
| 35 | 113.248 | (Variable) | | |
| Image Plane | ∞ | | | |

-continued

UNIT: mm

ASPHERIC DATA

1st Surface
K = 0.00000e+00 A 4 = −9.50512e−07 A 6 = 1.79155e−09
A 8 = −1.97128e−12 A10 = 1.43697e−15 A12 = −5.96668e−19
A14 = 1.09118e−22
2nd Surface
K = −4.16769e−02 A 4 = −3.94965e−06 A 6 = −7.28831e−11
A 8 = −1.38245e−12 A10 = −1.03900e−15 A12 = 1.33767e−18
A14 = −1.50434e−21
8th Surface
K = 0.00000e+00 A 4 = −2.71826e−06 A 6 = −1.51804e−09
A 8 = 2.54633e−12 A10 = −3.26838e−15 A12 = 3.11330e−18
9th Surface
K = 0.00000e+00 A 4 = 1.54308e−06 A 6 = −1.23292e−09
A 8 = 6.54387e−13 A10 = −9.98610e−16 A12 = 1.82324e−18
26th Surface
K = 0.00000e+00 A 4 = −3.97671e−07 A 6 = −1.43026e−10
A 8 = −3.39618e−12 A10 = 6.90881e−14 A12 = −1.11857e−16
30th Surface
K = 0.00000e+00 A 4 = −4.58114e−06 A 6 = 4.75662e−09
A 8 = 5.58946e−11 A10 = −2.52257e−13 A12 = 3.34546e−16
31st Surface
K = 0.00000e+00 A 4 = 3.26579e−07 A 6 = 2.19767e−09
A 8 = 4.65083e−11 A10 = −1.78575e−13 A12 = 2.00668e−16

VARIOUS DATA

ZOOM RATIO 4.42

| | WIDE | MIDDLE | TELE |
|---|---|---|---|
| Focal Length | 18.53 | 27.07 | 81.99 |
| Fno | 2.91 | 2.91 | 2.91 |
| Half Angle of View (°) | 44.50 | 38.63 | 14.78 |
| Image Height | 18.21 | 21.64 | 21.64 |
| Overall Lens Length | 240.84 | 208.07 | 175.34 |
| BF | 21.80 | 21.80 | 21.80 |
| d6 | 75.52 | 42.25 | 4.72 |
| d7 | 19.62 | 16.04 | −2.72 |
| d14 | 1.01 | 4.59 | 23.35 |
| d20 | 23.66 | 19.22 | 1.49 |
| d25 | 1.93 | 1.50 | 5.51 |
| d29 | 2.20 | 7.08 | 20.78 |
| d33 | 1.00 | 1.50 | 6.30 |
| d35 | 21.80 | 21.80 | 21.80 |

LENS UNIT DATA

| Lens Unit | Starting Surface | Focal Length |
|---|---|---|
| 1 | 1 | −40.40 |
| 2 | 8 | 35.76 |
| 3 | 15 | −38.09 |
| 4 | 21 | 36.57 |
| 5 | 26 | −47.17 |
| 6 | 30 | −555.61 |
| 7 | 34 | 123.11 |

Numerical Example 3

UNIT: mm

SURFACE DATA

| Surface No. | r | d | nd | νd |
|---|---|---|---|---|
| 1* | 272.405 | 2.50 | 1.85135 | 40.1 |
| 2* | 32.519 | 17.04 | | |
| 3 | −89.381 | 1.93 | 1.55032 | 75.5 |
| 4 | 111.496 | 0.15 | | |
| 5 | 83.020 | 5.45 | 1.85478 | 24.8 |
| 6 | 737.936 | (Variable) | | |

-continued

UNIT: mm

| | | | | |
|---|---|---|---|---|
| 7 (SSP) | ∞ | (Variable) | | |
| 8* | 43.486 | 7.71 | 1.43875 | 94.7 |
| 9* | −219.017 | 0.15 | | |
| 10 | 220.776 | 1.65 | 1.92286 | 20.9 |
| 11 | 55.652 | 7.79 | 1.59410 | 60.5 |
| 12 | −98.330 | 0.15 | | |
| 13 | 78.895 | 5.67 | 1.76385 | 48.5 |
| 14 | −142.582 | (Variable) | | |
| 15 (SP) | ∞ | 1.88 | | |
| 16 | 774.278 | 0.90 | 1.90043 | 37.4 |
| 17 | 42.728 | 4.11 | | |
| 18 | −54.464 | 0.90 | 1.51633 | 64.1 |
| 19 | 36.402 | 3.40 | 1.94594 | 18.0 |
| 20 | 188.854 | (Variable) | | |
| 21 | 89.992 | 0.95 | 2.00069 | 25.5 |
| 22 | 24.701 | 7.19 | 1.59282 | 68.6 |
| 23 | −107.248 | 0.15 | | |
| 24 | 45.599 | 5.32 | 1.69680 | 55.5 |
| 25 | −100.786 | 1.61 | | |
| 26* | 50.479 | 0.10 | 1.58946 | 30.6 |
| 27 | 49.930 | 2.80 | 1.95906 | 17.5 |
| 28 | 164.877 | 1.10 | 1.91650 | 31.6 |
| 29 | 26.981 | (Variable) | | |
| 30* | 35.082 | 9.74 | 1.49700 | 81.5 |
| 31* | −99.136 | 1.41 | | |
| 32 | −361.183 | 1.45 | 2.05090 | 26.9 |
| 33 | 41.563 | 1.39 | | |
| 34 | 36.188 | 2.34 | 1.77250 | 49.6 |
| 35 | 48.385 | (Variable) | | |
| Image Plane | ∞ | | | |

ASPHERIC DATA

1st Surface
K = 0.00000e+00 A 4 = 4.84619e−07 A 6 = −1.52564e−09
A 8 = 2.39357e−12 A10 = −1.91408e−15 A12 = 7.36468e−19
A14 = −1.07382e−22
2nd Surface
K = −7.82226e−01 A 4 = 1.03414e−06 A 6 = 1.96602e−10
A 8 = −5.16521e−12 A10 = 1.64618e−14 A12 = −1.87081e−17
A14 = 7.40995e−21
8th Surface
K = 0.00000e+00 A 4 = −3.41104e−06 A 6 = −3.01887e−09
A 8 = 1.15437e−11 A10 = −2.35113e−14 A12 = 2.28615e−17
9th Surface
K = 0.00000e+00 A 4 = 2.01511e−06 A 6 = −2.72731e−09
A 8 = 8.30618e−12 A10 = −1.61564e−14 A12 = 1.71290e−17
26th Surface
K = 0.00000e+00 A 4 = −2.92776e−07 A 6 = 2.26837e−09
A 8 = −1.40921e−11 A10 = 9.84176e−14 A12 = −1.00831e−16
30th Surface
K = 0.00000e+00 A 4 = −3.31205e−06 A 6 = 2.90996e−08
A 8 = −5.38423e−11 A10 = 2.73031e−13 A12 = 1.59222e−16
31st Surface
K = 0.00000e+00 A 4 = 5.45817e−07 A 6 = 3.40571e−08
A 8 = −4.07579e−11 A10 = 8.18106e−14 A12 = 1.11712e−15

VARIOUS DATA

ZOOM RATIO 3.88

| | WIDE | MIDDLE | TELE |
|---|---|---|---|
| Focal Length | 17.51 | 24.07 | 67.89 |
| Fno | 2.91 | 2.91 | 2.91 |
| Half Angle of View (°) | 46.19 | 41.11 | 17.67 |
| Image Height | 18.25 | 21.00 | 21.64 |
| Overall Lens Length | 231.41 | 200.41 | 165.76 |
| BF | 17.39 | 16.90 | 22.97 |
| d6 | 77.35 | 45.76 | 4.28 |
| d7 | 15.55 | 12.62 | −2.27 |
| d14 | 1.01 | 3.94 | 18.83 |
| d20 | 21.44 | 18.83 | 1.55 |
| d29 | 1.75 | 5.43 | 23.46 |
| d35 | 17.39 | 16.90 | 22.97 |

-continued

UNIT: mm

LENS UNIT DATA

| Lens Unit | Starting Surface | Focal Length |
|---|---|---|
| 1 | 1 | −39.19 |
| 2 | 8 | 35.06 |
| 3 | 15 | −43.80 |
| 4 | 21 | 88.66 |
| 5 | 30 | −1179.52 |

Numerical Example 4

UNIT: mm

SURFACE DATA

| Surface No. | r | d | nd | νd |
|---|---|---|---|---|
| 1* | 228.923 | 2.50 | 1.88202 | 37.2 |
| 2* | 39.181 | 4.57 | | |
| 3 | 65.537 | 1.50 | 2.05090 | 26.9 |
| 4 | 45.608 | 13.83 | | |
| 5 | −68.067 | 1.50 | 1.43875 | 94.7 |
| 6 | 74.638 | 5.87 | 1.85478 | 24.8 |
| 7 | −7361.584 | (Variable) | | |
| 8 | −65.062 | 1.10 | 1.59282 | 68.6 |
| 9 | −156.336 | 1.20 | | |
| 10 (SSP) | ∞ | (Variable) | | |
| 11* | 49.526 | 7.34 | 1.49700 | 81.5 |
| 12* | −136.558 | 0.15 | | |
| 13 | 126.472 | 1.50 | 1.92286 | 20.9 |
| 14 | 58.251 | 7.85 | 1.59282 | 68.6 |
| 15 | −87.797 | 0.15 | | |
| 16 | 79.673 | 6.53 | 1.59282 | 68.6 |
| 17 | −90.314 | (Variable) | | |
| 18 (SP) | ∞ | 1.87 | | |
| 19 | 658.526 | 0.90 | 1.90043 | 37.4 |
| 20 | 43.614 | 3.54 | | |
| 21 | −72.644 | 0.90 | 1.51633 | 64.1 |
| 22 | 33.301 | 3.02 | 1.94594 | 18.0 |
| 23 | 96.339 | (Variable) | | |
| 24 | 64.813 | 0.95 | 2.00069 | 25.5 |
| 25 | 22.985 | 7.10 | 1.59282 | 68.6 |
| 26 | −107.642 | 0.15 | | |
| 27 | 43.241 | 4.85 | 1.69680 | 55.5 |
| 28 | −114.432 | (Variable) | | |
| 29* | 65.050 | 0.10 | 1.58946 | 30.6 |
| 30 | 67.455 | 3.98 | 1.95906 | 17.5 |
| 31 | −472.572 | 1.10 | 1.91650 | 31.6 |
| 32 | 25.793 | (Variable) | | |
| 33* | 38.064 | 9.48 | 1.49700 | 81.5 |
| 34* | −37.603 | 0.15 | | |
| 35 | −66.854 | 1.45 | 2.05090 | 26.9 |
| 36 | 104.649 | (Variable) | | |
| Image Plane | ∞ | | | |

ASPHERIC DATA

1st Surface
K = 0.00000e+00 A 4 = 1.43874e−06 A 6 = −2.70889e−09
A 8 = 3.04928e−12 A10 = −1.79059e−15 A12 = 5.27201e−19
A14 = −5.36219e−23
2nd Surface
K = −1.16092e+00 A 4 = 2.27368e−06 A 6 = −1.33805e−09
A 8 = −4.67404e−12 A10 = 1.44861e−14 A12 = −1.45170e−17
A14 = 5.59238e−21
11th Surface
K = 0.00000e+00 A 4 = −2.64544e−06 A 6 = −5.24547e−10
A 8 = 1.36897e−11 A10 = −3.10043e−14 A12 = 4.75764e−17
12th Surface
K = 0.00000e+00 A 4 = 3.99180e−06 A 6 = −4.27099e−10
A 8 = 1.09154e−11 A10 = −2.75985e−14 A12 = 5.07342e−17
29th Surface -continued

| UNIT: mm |
|---|
| K = 0.00000e+00 A 4 = −5.93625e−07 A 6 = 2.28779e−09 |
| A 8 = −1.61000e−11 A10 = 1.97658e−13 A12 = −3.14293e−16 |
| 33rd Surface |
| K = 0.00000e+00 A 4 = −7.43266e−06 A 6 = 1.61026e−08 |
| A 8 = 7.84779e−12 A10 = −1.92796e−13 A12 = 8.09247e−16 |
| 34th Surface |
| K = 0.00000e+00 A 4 = −1.55089e−06 A 6 = 1.89072e−08 |
| A 8 = 2.52541e−11 A10 = −3.09996e−13 A12 = 1.05678e−15 |

VARIOUS DATA

| ZOOM RATIO | 3.59 | | |
|---|---|---|---|
| | WIDE | MIDDLE | TELE |
| Focal Length | 16.42 | 22.16 | 58.98 |
| Fno | 2.91 | 2.91 | 2.91 |
| Half Angle of View (°) | 47.94 | 44.31 | 20.14 |
| Image Height | 18.19 | 21.64 | 21.64 |
| Overall Lens Length | 222.27 | 197.60 | 165.88 |
| BF | 18.76 | 19.14 | 23.16 |
| d7 | 64.35 | 39.30 | 3.56 |
| d10 | 16.61 | 14.18 | 0.29 |
| d17 | 1.03 | 3.47 | 17.35 |
| d23 | 22.02 | 18.50 | 1.50 |
| d28 | 2.28 | 1.50 | 3.14 |
| d32 | 2.10 | 6.40 | 21.77 |
| d36 | 18.76 | 19.14 | 23.16 |

LENS UNIT DATA

| Lens Unit | Starting Surface | Focal Length |
|---|---|---|
| 1 | 1 | −37.04 |
| 2 | 8 | −188.83 |
| 3 | 11 | 31.08 |
| 4 | 18 | −42.18 |
| 5 | 24 | 39.60 |
| 6 | 29 | −51.17 |
| 7 | 33 | 580.76 |

Numerical Example 5

UNIT: mm

SURFACE DATA

| Surface No. | r | d | nd | νd |
|---|---|---|---|---|
| 1* | 205.213 | 2.50 | 1.85135 | 40.1 |
| 2* | 32.518 | 19.10 | | |
| 3 | −82.997 | 1.50 | 1.59282 | 68.6 |
| 4 | 125.653 | 0.15 | | |
| 5 | 93.156 | 5.79 | 1.85478 | 24.8 |
| 6 | −4712.977 | (Variable) | | |
| 7 (SSP) | ∞ | (Variable) | | |
| 8* | 66.150 | 9.10 | 1.43875 | 94.7 |
| 9* | −127.840 | 0.15 | | |
| 10 | 70.012 | 1.50 | 1.92286 | 20.9 |
| 11 | 49.544 | 10.62 | 1.49700 | 81.5 |
| 12 | −76.540 | 0.15 | | |
| 13 | 113.375 | 5.40 | 1.59282 | 68.6 |
| 14 | −113.300 | (Variable) | | |
| 15 (SP) | ∞ | 1.84 | | |
| 16* | 313.021 | 1.80 | 1.58313 | 59.4 |
| 17* | 38.446 | 3.20 | | |
| 18 | −87.198 | 0.90 | 1.56883 | 56.4 |
| 19 | 31.057 | 2.26 | 1.94594 | 18.0 |
| 20 | 54.694 | (Variable) | | |

-continued

UNIT: mm

| Surface No. | r | d | nd | νd |
|---|---|---|---|---|
| 21 | 59.498 | 0.95 | 2.00069 | 25.5 |
| 22 | 21.882 | 6.09 | 1.53775 | 74.7 |
| 23 | −76.051 | 0.15 | | |
| 24 | 31.999 | 4.99 | 1.59282 | 68.6 |
| 25 | −105.668 | (Variable) | | |
| 26 | 82.106 | 2.79 | 1.95906 | 17.5 |
| 27 | −193.405 | 1.50 | 1.91650 | 31.6 |
| 28* | 24.204 | (Variable) | | |
| 29 | 46.837 | 4.07 | 1.49700 | 81.5 |
| 30* | 137.054 | (Variable) | | |
| Image Plane | ∞ | | | |

| ASPHERIC DATA |
|---|
| 1st Surface |
| K = 0.00000e+00 A 4 = −9.88189e−07 A 6 = 1.63077e−09 |
| A 8 = −1.24390e−12 A10 = 6.67679e−16 A12 = −2.20682e−19 |
| A14 = 3.24067e−23 |
| 2nd Surface |
| K = −1.00673e+00 A 4 = 3.23801e−07 A 6 = 2.62211e−09 |
| A 8 = −4.26933e−12 A10 = 9.52180e−15 A12 = −8.85461e−18 |
| A14 = 3.48626e−21 |
| 8th Surface |
| K = 0.00000e+00 A 4 = −6.30975e−06 A 6 = −5.82447e−09 |
| A 8 = −1.11890e−11 A10 = 2.02099e−14 A12 = −4.32829e−17 |
| 9th Surface |
| K = 0.00000e+00 A 4 = −1.05071e−06 A 6 = −5.74042e−09 |
| A 8 = −8.45450e−12 A10 = 1.29702e−14 A12 = −2.55556e−17 |
| 16th Surface |
| K = 0.00000e+00 A 4 = −5.90962e−06 A 6 = −7.91607e−10 |
| A 8 = 9.22040e−11 A10 = −2.63221e−13 A12 = 6.87268e−16 |
| 17th Surface |
| K = 0.00000e+00 A 4 = −7.61281e−06 A 6 = −6.31343e−09 |
| A 8 = 3.92965e−11 A10 = 2.49278e−13 |
| 28th Surface |
| K = 0.00000e+00 A 4 = 1.85586e−06 A 6 = −9.20718e−09 |
| A 8 = 2.57022e−12 A10 = −7.13584e−14 |
| 30th Surface |
| K = 0.00000e+00 A 4 = −1.36639e−06 A 6 = −9.02289e−09 |
| A 8 = 1.92711e−11 A10 = −2.57563e−15 A12 = −5.46607e−17 |

VARIOUS DATA

| ZOOM RATIO | 3.94 | | |
|---|---|---|---|
| | WIDE | MIDDLE | TELE |
| Focal Length | 17.52 | 24.12 | 68.99 |
| Fno | 2.91 | 2.91 | 2.91 |
| Half Angle of View (°) | 46.70 | 41.89 | 17.41 |
| Image Height | 18.59 | 21.64 | 21.64 |
| Overall Lens Length | 240.00 | 207.06 | 160.96 |
| BF | 22.47 | 23.47 | 29.17 |
| d6 | 87.17 | 53.22 | 1.42 |
| d7 | 18.86 | 16.11 | 0.58 |
| d14 | 1.05 | 3.80 | 19.33 |
| d20 | 16.87 | 14.83 | 1.97 |
| d25 | 1.92 | 1.48 | 4.41 |
| d28 | 5.16 | 7.63 | 17.56 |
| d30 | 22.47 | 23.47 | 29.17 |

LENS UNIT DATA

| Lens Unit | Starting Surface | Focal Length |
|---|---|---|
| 1 | 1 | −39.66 |
| 2 | 8 | 35.49 |
| 3 | 15 | −39.02 |
| 4 | 21 | 37.15 |
| 5 | 26 | −40.02 |
| 6 | 29 | 141.05 |

Numerical Example 6

| UNIT: mm | | | | |
|---|---|---|---|---|
| SURFACE DATA | | | | |
| Surface No. | r | d | nd | νd |
| 1* | 375.361 | 2.80 | 1.76385 | 48.5 |
| 2* | 36.584 | 20.12 | | |
| 3 | −86.409 | 1.70 | 1.59282 | 68.6 |
| 4 | 146.182 | 5.09 | 1.85478 | 24.8 |
| 5 | −722.748 | (Variable) | | |
| 6 (SSP) | ∞ | 0.25 | | |
| 7 | 176.394 | 2.78 | 1.59410 | 60.5 |
| 8 | −487.376 | (Variable) | | |
| 9* | 42.926 | 9.87 | 1.43875 | 94.7 |
| 10* | −169.248 | 0.15 | | |
| 11 | 82.862 | 1.50 | 1.92286 | 20.9 |
| 12 | 60.137 | 8.62 | 1.59282 | 68.6 |
| 13 | −104.581 | (Variable) | | |
| 14 (SP) | ∞ | 1.59 | | |
| 15 | 263.238 | 0.90 | 1.95375 | 32.3 |
| 16 | 51.608 | 3.75 | | |
| 17 | −78.895 | 0.90 | 1.66672 | 48.3 |
| 18 | 36.023 | 3.44 | 1.94594 | 18.0 |
| 19 | 118.952 | (Variable) | | |
| 20 | 97.722 | 0.95 | 1.92286 | 20.9 |
| 21 | 25.692 | 8.47 | 1.59282 | 68.6 |
| 22 | −67.808 | 0.15 | | |
| 23 | 40.883 | 4.32 | 1.76385 | 48.5 |
| 24 | −303.456 | (Variable) | | |
| 25* | 67.635 | 0.10 | 1.58946 | 30.6 |
| 26 | 78.739 | 4.32 | 1.95906 | 17.5 |
| 27 | −60.904 | 1.10 | 1.77047 | 29.7 |
| 28 | 25.432 | 3.60 | | |
| 29 | 343.962 | 1.10 | 2.05090 | 26.9 |
| 30 | 54.922 | (Variable) | | |
| 31* | 40.808 | 6.01 | 1.49700 | 81.5 |
| 32* | 95.182 | (Variable) | | |
| 33 | 82.264 | 4.44 | 1.48749 | 70.2 |
| 34 | −314.380 | (Variable) | | |
| Image Plane | ∞ | | | |

ASPHERIC DATA

1st Surface
K = 0.00000e+00 A 4 = −1.87609e−09 A 6 = −7.38985e−10
A 8 = 9.11160e−13 A10 = −4.26810e−16 A12 = 7.96351e−20
A14 = −8.05387e−25
2nd Surface
K = −8.18376e−01 A 4 = −5.81382e−08 A 6 = −1.40202e−10
A 8 = −3.00361e−12 A10 = 7.45603e−15 A12 = −6.49957e−18
A14 = 2.20556e−21
9th Surface
K = 0.00000e+00 A 4 = −1.70538e−06 A 6 = −9.30327e−10
A 8 = 6.44829e−13 A10 = 1.69731e−15 A12 = −4.19309e−18
10th Surface
K = 0.00000e+00 A 4 = 2.47908e−06 A 6 = −6.63787e−10
A 8 = 1.65371e−13 A10 = 3.48892e−15 A12 = −5.69885e−18
25th Surface
K = 0.00000e+00 A 4 = −4.83685e−06 A 6 = 6.50676e−09
A 8 = −3.56109e−11 A10 = 2.05736e−13 A12 = −4.03589e−16
31st Surface
K = 0.00000e+00 A 4 = 4.67369e−06 A 6 = 2.69708e−08
A 8 = −2.44308e−11 A10 = 6.23593e−14 A12 = 9.21912e−17
32nd Surface
K = 0.00000e+00 A 4 = 5.53075e−06 A 6 = 2.66515e−08
A 8 = −3.73036e−12 A10 = 2.14846e−14 A12 = 3.22441e−16

VARIOUS DATA

| ZOOM RATIO | 4.51 | | |
|---|---|---|---|
| | WIDE | MIDDLE | TELE |
| Focal Length | 17.51 | 24.01 | 79.00 |
| Fno | 2.91 | 2.91 | 2.91 |
| Half Angle of View (°) | 46.13 | 40.49 | 15.32 |

-continued

| UNIT: mm | | | |
|---|---|---|---|
| Image Height | 18.21 | 20.50 | 21.64 |
| Overall Lens Length | 266.05 | 230.35 | 180.05 |
| BF | 20.58 | 20.58 | 20.58 |
| d5 | 103.18 | 65.69 | 1.24 |
| d8 | 21.20 | 18.31 | 1.00 |
| d13 | 1.02 | 3.91 | 21.22 |
| d19 | 18.53 | 15.91 | 1.64 |
| d24 | 1.50 | 1.60 | 8.20 |
| d30 | 1.00 | 3.52 | 11.19 |
| d32 | 1.00 | 2.79 | 16.94 |
| d34 | 20.58 | 20.58 | 20.58 |

LENS UNIT DATA

| Lens Unit | Starting Surface | Focal Length |
|---|---|---|
| 1 | 1 | −41.76 |
| 2 | 6 | 218.35 |
| 3 | 9 | 44.29 |
| 4 | 14 | −41.38 |
| 5 | 20 | 37.28 |
| 6 | 25 | −34.57 |
| 7 | 31 | 138.64 |
| 8 | 33 | 134.24 |

TABLE 1

| | Numerical Example | | | | | |
|---|---|---|---|---|---|---|
| | 1 | 2 | 3 | 4 | 5 | 6 |
| ft | 67.88 | 81.99 | 67.89 | 58.98 | 68.99 | 79.00 |
| fL1 | −38.24 | −40.40 | −39.19 | −37.04 | −39.66 | −41.76 |
| fG1 | −43.77 | −53.69 | −43.58 | −53.93 | −45.69 | −53.26 |
| TLt | 164.01 | 175.34 | 165.76 | 165.88 | 160.96 | 180.05 |
| ML1 | 59.96 | 65.50 | 65.65 | 56.39 | 79.05 | 86.00 |
| MLR1 | −24.96 | −27.64 | −25.22 | −4.40 | −24.98 | −15.94 |
| TDL1 | 25.54 | 23.85 | 27.07 | 29.77 | 29.04 | 29.72 |
| Skw | 18.22 | 21.80 | 17.39 | 18.76 | 22.47 | 20.58 |
| Skt | 18.22 | 21.80 | 22.97 | 23.16 | 29.17 | 20.58 |
| ndG1 | 1.76 | 1.62 | 1.85 | 1.88 | 1.85 | 1.76 |
| βLRw | −0.46 | −0.46 | −0.45 | −0.44 | −0.44 | −0.42 |
| βLRt | −1.78 | −2.03 | −1.73 | −1.59 | −1.74 | −1.89 |
| Ymax_w | 18.22 | 18.21 | 18.25 | 18.19 | 18.59 | 18.21 |
| Dist_w | −15.77 | −15.86 | −15.66 | −15.90 | −14.07 | −15.82 |
| Inequality | | | | | | |
| (1) | 0.37 | 0.37 | 0.40 | 0.34 | 0.49 | 0.48 |
| (2) | −0.56 | −0.49 | −0.58 | −0.63 | −0.57 | −0.53 |
| (3) | −1.57 | −1.62 | −1.68 | −1.52 | −1.99 | −2.06 |
| (4) | 0.30 | 0.33 | 0.26 | 0.33 | 0.28 | 0.24 |
| (5) | 0.30 | 0.33 | 0.35 | 0.41 | 0.37 | 0.24 |
| (6) | 0.43 | 0.36 | 0.41 | 0.53 | 0.37 | 0.35 |
| (7) | −0.42 | −0.42 | −0.38 | −0.08 | −0.32 | −0.19 |
| (8) | −0.37 | −0.34 | −0.37 | −0.07 | −0.36 | −0.20 |
| (9) | 1.76 | 1.62 | 1.85 | 1.88 | 1.85 | 1.76 |
| (10) | 1.14 | 1.33 | 1.11 | 1.46 | 1.15 | 1.28 |
| (11) | 3.87 | 4.42 | 3.88 | 3.59 | 3.94 | 4.51 |
| (12) | −0.48 | −0.45 | −0.47 | −0.49 | −0.47 | −0.44 |
| (13) | −15.77 | −15.86 | −15.66 | −15.90 | −14.07 | −15.82 |

Figure 13:
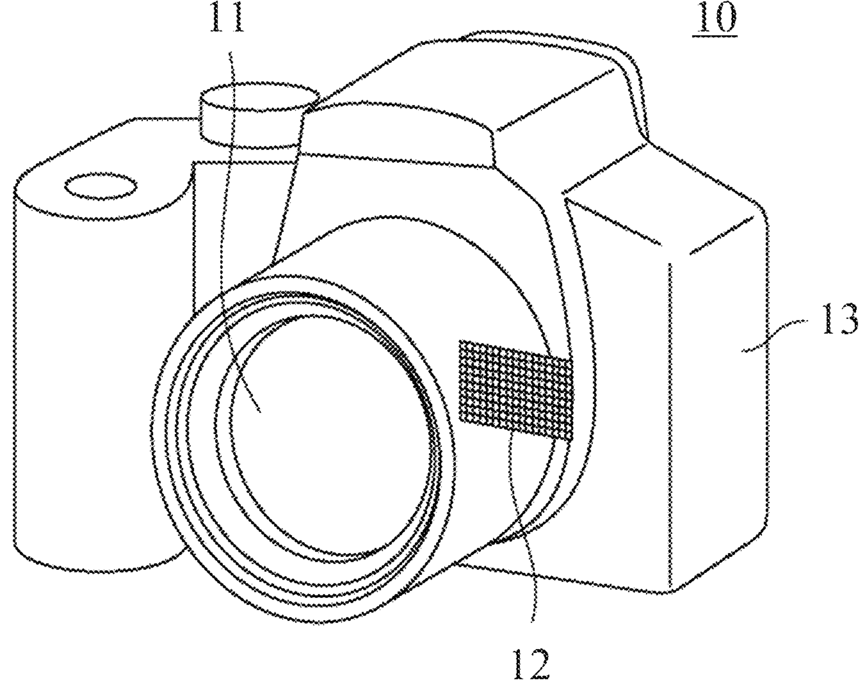
FIG. 13 is a schematic diagram of an image pickup apparatus having the zoom lens according to any one of the above examples.

FIG. 13 illustrates an image pickup apparatus (digital still camera) 10 that uses the zoom lens according to any one of Examples 1 to 6 as an imaging optical system. The image pickup apparatus 10 includes a camera body 13, an imaging optical system 11 as one of the zoom lenses L0 according to Examples 1 to 6, and an image sensor 12 configured to capture (photoelectrically converts) an object image as an optical image formed by the imaging optical system 11.

The image pickup apparatus 10 includes a zoom lens that has a reduced size and high optical performance as the imaging optical system 11, and it can provide high-quality images despite its small size.

A photoelectric conversion element such as a CCD sensor or a CMOS sensor is used as the image sensor 12. Electrically correcting various aberrations such as distortion and chromatic aberration in an image obtained by the image sensor 12 through image processing can also provide a higher-quality captured image.

The zoom lens L0 according to each example can be used not only for the digital still camera illustrated in FIG. 13, but also for various image pickup apparatuses such as video cameras, surveillance cameras, and film-based cameras.

Imaging System

An imaging system (such as a surveillance camera system) may include the zoom lens L0 according to any one of the above examples and a control unit configured to control the zoom lens L0. In this case, the control unit can control the zoom lens L0 so that each lens unit moves as described above during zooming, focusing, and image stabilization. In this case, the control unit does not need to be integrated with the zoom lens L0, and the control unit may be separate from the zoom lens L0 (a drive unit configured to drive a lens unit, etc.). For example, a configuration may be adopted in which a control apparatus as a control unit disposed remotely from the drive unit includes a transmission unit configured to transmit (output) a control signal for controlling the zoom lens L0 to the drive unit. Due to this control unit, the zoom lens L0 can be remotely operated.

The control unit may include an operation unit configured to receive user input such as a controller or button for remotely operating the zoom lens L0, and to control the zoom lens L0 according to the user input into the operation unit. For example, an enlargement button or a reduction button may be provided as the operation unit. In this case, a signal may be sent from the control unit to the drive unit of the zoom lens L0 so as to increase the magnification of the zoom lens L0 as the user presses the enlargement button, and to decrease the magnification of the zoom lens L0 as the user presses the reduction button.

The imaging system may further include a display unit such as a liquid crystal panel that displays information regarding the zoom of the zoom lens L0. The information regarding the zoom of the zoom lens L0 is, for example, the zoom magnification (zoom state) and a moving amount (movement state) of each lens unit. In this case, the user can remotely operate the zoom lens L0 via the operation unit while viewing the information regarding the zoom displayed on the display unit. In this case, the display unit and the operation unit may be integrated, for example, by using a touch panel.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can provide a zoom lens having a reduced size, a wide angle of view, a high magnification varying ratio, and high optical performance.

This application claims priority to Japanese Patent Application No. 2023-148485, which was filed on Sep. 13, 2023, and which is hereby incorporated by reference herein in its entirety.

What is claimed is:

1. A zoom lens comprising:

a first lens unit having negative refractive power and disposed closest to an object; and a rear group including three or more lens units and disposed on an image side of the first lens unit, wherein a distance between adjacent lens units changes during zooming, wherein the first lens unit moves toward the image side during zooming from a wide-angle end to a telephoto end, and wherein in a case where a sign of a moving amount of a lens unit configured to move toward the image side during zooming from the wide-angle end to the telephoto end is set positive, the following inequalities are satisfied:

$$0.30 \le ML1/TLt \le 0.90$$

$$-0.80 \le fL1/ft \le -0.40$$

where ML1 is a moving amount of the first lens unit during zooming from the wide-angle end to the telephoto end, TLt is an overall optical length of the zoom lens at the telephoto end, fL1 is a focal length of the first lens unit, and ft is a focal length of the zoom lens at the telephoto end.

2. The zoom lens according to claim 1, further comprising an aperture stop and an auxiliary aperture, each of which is disposed on the image side of the first lens unit L1.

3. The zoom lens according to claim 1, wherein the following inequality is satisfied:

$$-3.00 \le ML1/fL1 \le -1.00.$$

4. The zoom lens according to claim 1, wherein the following inequality is satisfied:

$$0.10 \le Skw/ML1 \le 0.60$$

where Skw is a back focus of the zoom lens at the wide-angle end.

5. The zoom lens according to claim 1, wherein the following inequality is satisfied:

$$0.10 \le Skt/ML1 \le 0.70$$

where Skt is a back focus of the zoom lens at the telephoto end.

6. The zoom lens according to claim 1, wherein the following inequality is satisfied:

$$0.20 \le TDL1/ML1 \le 0.65$$

where TDL1 is a distance on an optical axis from a lens surface closest to the object of the first lens unit to a lens surface closest to an image plane of the first lens unit.

7. The zoom lens according to claim 1, wherein the following inequality is satisfied:

$$-0.70 \le MLR1/ML1 \le -0.02$$

where MLR1 is a moving amount toward an object side of a lens unit closest to the object of the rear group during zooming from the wide-angle end to the telephoto end.

8. The zoom lens according to claim 1, wherein the following inequality is satisfied:

$$-0.70 \leq MLR1/ft \leq -0.02$$

where MLR1 is a moving amount of a lens unit closest to the object of the rear group toward an object side during zooming from the wide-angle end to the telephoto end.

9. The zoom lens according to claim 1, wherein the following inequality is satisfied:

$$1.50 \leq ndG1 \leq 2.00$$

where ndG1 is a refractive index for d-line of a lens closest to the object in the zoom lens.

10. The zoom lens according to claim 1, wherein the following inequality is satisfied:

$$0.60 \leq fG1/fL1 \leq 2.00$$

where fG1 is a focal length of a lens closest to the object in the zoom lens.

11. The zoom lens according to claim 1, wherein the following inequality is satisfied:

$$3.30 \leq \beta LRt/\beta LRw \leq 8.00$$

where βLRt is a lateral magnification of the rear group at the telephoto end, and βLRw is a lateral magnification of the rear group at the wide-angle end.

12. The zoom lens according to claim 1, wherein the following inequality is satisfied:

$$-1.60 \leq \text{Ymax\_w}/fL1 \leq -0.20$$

where Ymax_w is a maximum image height of the zoom lens at the wide-angle end in an in-focus state on an object at infinity.

13. The zoom lens according to claim 1, wherein the following inequality is satisfied:

$$-20.0 \leq \text{Dist\_w} \leq -8.0$$

where Dist_w is a distortion amount at a maximum image height of the zoom lens at the wide-angle end in an in-focus state on an object at infinity.

14. The zoom lens according to claim 1, wherein the first lens unit includes two or more negative lenses and one or more positive lenses.

15. The zoom lens according to claim 1, wherein the rear group includes:

an aperture stop; and at least one focus lens unit configured to move during focusing, and disposed on the image side of the aperture stop.

16. The zoom lens according to claim 1, wherein the rear group includes:

an aperture stop; and an image stabilizing unit configured to move relative to an optical axis to reduce image blur, and disposed as at least a part of a single lens unit disposed on the image side of the aperture stop.

17. The zoom lens according to claim 1, wherein the rear group includes three or more lens units in which distances change during zooming.

18. The zoom lens according to claim 1, wherein the three or more lens units included in the rear group include, in order from an object side to the image side:

a second lens unit having positive refractive power;
a third lens unit having negative refractive power;
a fourth lens unit having positive refractive power;
a fifth lens unit having negative refractive power;
a sixth lens unit having negative refractive power; and
a seventh lens unit having positive refractive power.

19. The zoom lens according to claim 1, wherein the three or more lens units included in the rear group include, in order from an object side to the image side:

a second lens unit having positive refractive power;
a third lens unit having negative refractive power;
a fourth lens unit having positive refractive power; and
a fifth lens unit having negative refractive power.

20. The zoom lens according to claim 1, wherein the three or more lens units included in the rear group include, in order from an object side to the image side:

a second lens unit having negative refractive power;
a third lens unit having positive refractive power;
a fourth lens unit having negative refractive power;
a fifth lens unit having positive refractive power;
a sixth lens unit having negative refractive power; and
a seventh lens unit having positive refractive power.

21. The zoom lens according to claim 1, wherein the three or more lens units included in the rear group include, in order from an object side to the image side:

a second lens unit having positive refractive power;
a third lens unit having negative refractive power;
a fourth lens unit having positive refractive power;
a fifth lens unit having negative refractive power; and
a sixth lens unit having positive refractive power.

22. The zoom lens according to claim 1, wherein the three or more lens units included in the rear group include, in order from an object side to the image side:

a second lens unit having positive refractive power;
a third lens unit having positive refractive power;
a fourth lens unit having negative refractive power;
a fifth lens unit having positive refractive power;
a sixth lens unit having negative refractive power;
a seventh lens unit having positive refractive power; and
an eighth lens unit having positive refractive power.

23. An image pickup apparatus comprising:

a zoom lens; and an image sensor configured to capture an optical image formed by the zoom lens, wherein the zoom lens includes:

a first lens unit having negative refractive power and disposed closest to an object; and a rear group including three or more lens units and disposed on an image side of the first lens unit, wherein a distance between adjacent lens units changes during zooming, wherein the first lens unit moves toward the image side during zooming from a wide-angle end to a telephoto end, and wherein in a case where a sign of a moving amount of a lens unit configured to move toward the image side during zooming from the wide-angle end to the telephoto end is set positive, the following inequalities are satisfied:

$$0.30 \leq ML1/TLt \leq 0.90$$

$$-0.80 \leq fL1/ft \leq -0.40$$

where ML1 is a moving amount of the first lens unit during zooming from the wide-angle end to the telephoto end, TLt is an overall optical length of the zoom lens at the telephoto end, fL1 is a focal length of the first lens unit, and ft is a focal length of the zoom lens at the telephoto end.

24. The image pickup apparatus according to claim 23, wherein an effective image circle diameter at the wide-angle end is smaller than that at the telephoto end.

* * * * *